(12) United States Patent
Inoue

(10) Patent No.: US 7,225,634 B2
(45) Date of Patent: Jun. 5, 2007

(54) ABSORPTION REFRIGERATING MACHINE

(75) Inventor: Naoyuki Inoue, Tokyo (JP)

(73) Assignee: Ebara Corporation, Tokyo (JP)

( * ) Notice: Subject to any disclaimer, the term of this patent is extended or adjusted under 35 U.S.C. 154(b) by 153 days.

(21) Appl. No.: 10/529,209

(22) PCT Filed: Jun. 25, 2003

(86) PCT No.: PCT/JP03/08040

§ 371 (c)(1),
(2), (4) Date: Mar. 25, 2005

(87) PCT Pub. No.: WO2004/029524

PCT Pub. Date: Apr. 8, 2004

(65) Prior Publication Data

US 2006/0053829 A1 Mar. 16, 2006

(30) Foreign Application Priority Data

Sep. 27, 2002 (JP) ............................ 2002-283029
Oct. 7, 2002 (JP) ............................ 2002-293393

(51) Int. Cl.
*F25B 15/00* (2006.01)
(52) U.S. Cl. ..................................................... 62/476
(58) Field of Classification Search ................ 62/476, 62/477, 478, 481, 489, 497, 101, 141, 147
See application file for complete search history.

(56) References Cited

U.S. PATENT DOCUMENTS

| | | | | |
|---|---|---|---|---|
| 3,175,371 A * | 3/1965 | Harwich | ....................... | 62/101 |
| 3,495,420 A * | 2/1970 | Loweth et al. | ................. | 62/476 |
| 3,550,394 A * | 12/1970 | Peckham | ....................... | 62/485 |
| 3,651,654 A * | 3/1972 | Rachfal | ........................ | 62/103 |
| 3,710,852 A * | 1/1973 | Porter | ........................... | 165/62 |
| 3,721,109 A * | 3/1973 | Porter | ........................... | 62/476 |
| 4,085,595 A * | 4/1978 | Saito et al. | .................... | 62/476 |
| 4,183,228 A * | 1/1980 | Saito et al. | .................... | 62/497 |
| 4,487,036 A * | 12/1984 | Itoh et al. | ...................... | 62/474 |
| 4,570,456 A * | 2/1986 | Reimann et al. | .............. | 62/476 |
| 5,263,340 A * | 11/1993 | Sekoguchi et al. | ........... | 62/497 |
| 5,381,674 A * | 1/1995 | Omori et al. | .................. | 62/497 |
| 5,544,497 A * | 8/1996 | Inoue | ............................ | 62/497 |

FOREIGN PATENT DOCUMENTS

| | | | |
|---|---|---|---|
| EP | 0853220 A2 * | 7/1998 | |
| JP | 5-55787 | 8/1993 | |
| JP | 2000-171119 | 6/2000 | |
| JP | 2000-205691 | 7/2000 | |

* cited by examiner

*Primary Examiner*—Mohammad M. Ali
(74) *Attorney, Agent, or Firm*—Oblon, Spivak, McClelland, Maier & Neustadt, P.C.

(57) ABSTRACT

A triple effect absorption refrigerating machine comprising a high temperature regenerator GH, an intermediate temperature regenerator GM, a low temperature regenerator GL, a condenser C, an absorber A, an evaporator E, an auxiliary regenerator GX and an auxiliary absorber AX, either one of several combinations of paths for guiding a refrigerant among the components, thereby enabling an intermediate cycle between a double effect cycle and a triple effect cycle.

16 Claims, 11 Drawing Sheets

ABSORPTION REFRIGERATING MACHINE

FIELD OF THE INVENTION

The present invention relates to a triple effect absorption refrigerating machine, and in particular to a triple effect absorption refrigerating machine allowing for a relaxation of a pressure and a solution temperature in a high temperature regenerator.

DESCRIPTION OF THE PRIOR ART

There is a known absorption refrigerating machine taking advantage of a double effect cycle or a triple effect cycle according to a prior art, including those disclosed in Japanese Patent Publication of Unexamined Application Nos. Hei 7-146023 and Hei 8-136080, Japanese Patent Publication of Examined Application Nos. Sho 56-48782 and Sho 58-33467 and Japanese Patent Publication Nos. 2657703 and 2696575.

For the triple effect cycle, for the reason that if a cooling water temperature is high (e.g., a standard temperature in a range of 31° C. to 32° C. measured at a cooling water inlet port in summer in Japan), a high temperature regenerator would undergo a pressure around 0.3 MPa in gauge pressure and a high solution temperature that exceeds 190° C., it has been required to use a high class of material rather than ordinary SS material in order to ensure a certain level of strength and corrosion resistance, imposing a critical problem of cost in commercialization of products of the triple effect unit, but often ending up with the double effect unit.

It has been suggested that when the cooling water temperature decreases such that the high temperature regenerator of the triple effect cycle can be operated, for example, under a condition of a pressure not greater than 0.1 MPa in the gauge pressure and a solution temperature not higher than 175° C., the double effect cycle should be shifted to the triple effect cycle so as to improve the running efficiency (see, for example, Japanese Patent Publication Nos. 2657703 and 2696575).

The running efficiency is typically changed quite drastically between the double effect cycle and the triple effect cycle. If the triple effect cycle cannot be maintained efficiently, the running efficiency falls rapidly to the level of the double effect cycle, and it has been difficult to gain an intermediate running efficiency therebetween.

The present invention has been made in the above-described circumstances, and an object thereof is to provide a triple effect absorption refrigerating machine which can be operated in an intermediate cycle between the double effect cycle and the triple effect cycle, allows a pressure or a solution temperature in the high temperature regenerator to be suppressed to or below a predetermined value, and can be shifted continuously and gradually, not in a step-by-step manner, from the intermediate cycle to the triple effect cycle depending on a heat source temperature condition, a cooling water temperature condition, or a cold water temperature condition.

SUMMARY OF THE INVENTION

To accomplish the object described above, according to a first aspect of the present invention, there is provided a triple effect absorption refrigerating machine comprising a high temperature regenerator, an intermediate temperature regenerator, a low temperature regenerator, a condenser, an absorber, an evaporator, an auxiliary regenerator, an auxiliary absorber, and a path for interconnecting these devices, said triple effect absorption refrigerating machine characterized in further comprising: a high concentration circulation path for circulating a solution among said absorber, said auxiliary regenerator, said intermediate temperature regenerator and said high temperature regenerator; and a low concentration circulation path for circulating a solution between said auxiliary absorber and said low temperature regenerator, wherein said triple effect absorption refrigerating machine further comprises: a path for guiding a refrigerant vapor generated in said auxiliary regenerator to said auxiliary absorber; a path for guiding a refrigerant vapor generated in said intermediate temperature regenerator to said low temperature regenerator and said auxiliary regenerator in the heating sections thereof; and a path for guiding a refrigerant vapor generated in said high temperature regenerator to said intermediate temperature regenerator in the heating section thereof.

Said triple effect absorption refrigerating machine may further comprise a means for suspending or activating a function(s) of said auxiliary regenerator and/or said auxiliary absorber.

Further, according to a second aspect of the present invention, there is provided a triple effect absorption refrigerating machine comprising a high temperature regenerator, an intermediate temperature regenerator, a low temperature regenerator, a condenser, an absorber, an evaporator, an auxiliary regenerator, an auxiliary absorber and a path for interconnecting these devices, said triple effect absorption refrigerating machine characterized in further comprising: a path serving both for guiding a part of a dilute solution from said absorber to said auxiliary absorber and for guiding a dilute solution from said auxiliary absorber to said low temperature regenerator; a path for returning a solution in said low temperature regenerator to said absorber via said auxiliary regenerator; and a path for guiding a refrigerant vapor generated in said auxiliary regenerator to said auxiliary absorber, wherein said triple effect absorption refrigerating machine further comprises: a path for guiding a refrigerant vapor generated in said intermediate temperature regenerator to said low temperature regenerator and said auxiliary regenerator in the heating sections thereof; and a path for guiding a refrigerant vapor generated in said high temperature regenerator to said intermediate temperature regenerator in the heating section thereof.

Said triple effect absorption refrigerating machine according to the second aspect of the present invention may further comprise a means for suspending or activating a function(s) of said auxiliary regenerator and/or said auxiliary absorber.

Further, according to a third aspect of the present invention, there is provided a triple effect absorption refrigerating machine comprising a high temperature regenerator, an intermediate temperature regenerator, a low temperature regenerator, a condenser, an absorber, an evaporator, an auxiliary regenerator, an auxiliary absorber and a path for interconnecting these devices, said triple effect absorption refrigerating machine characterized in further comprising a means for switching cycles among:

(a) a cycle having:
  a high concentration circulation path for circulating a solution among said absorber, said auxiliary regenerator, said intermediate temperature regenerator and said high temperature regenerator; and
  a low concentration circulation path for circulating a solution between said auxiliary absorber and said low temperature regenerator, wherein said cycle forms:

a path for guiding a refrigerant vapor generated in said auxiliary regenerator to said auxiliary absorber;
a path for guiding a refrigerant vapor generated in said intermediate temperature regenerator to said low temperature regenerator and said auxiliary regenerator in the heating sections thereof; and
a path for guiding a refrigerant vapor generated in said high temperature regenerator to said intermediate temperature regenerator in the heating section thereof;
(b) a cycle having:
a path serving both for guiding a part of a dilute solution from said absorber to said auxiliary absorber and for guiding a dilute solution form said auxiliary absorber to said low temperature regenerator;
a path for returning a solution in said low temperature regenerator to said absorber via said auxiliary regenerator; and
a path for guiding a refrigerant vapor generated in said auxiliary regenerator to said auxiliary absorber, wherein said cycle forms:
a path for guiding a refrigerant vapor generated in said intermediate temperature regenerator to said low temperature regenerator and said auxiliary regenerator in the heating sections thereof; and
a path for guiding a refrigerant vapor generated in said high temperature regenerator to said intermediate temperature regenerator in the heating section thereof; and
(c) a cycle for suspending a function(s) of said auxiliary regenerator and/or said auxiliary absorber in either one of said (a) or (b) cycle.

Said auxiliary regenerator may comprise an adjusting mechanism for increasing/decreasing a heat-concentration power.

Further, said auxiliary absorber may comprise an adjusting mechanism for increasing/decreasing an absorption power.

Still further, said auxiliary regenerator may comprise an adjusting mechanism for increasing/decreasing a heat-concentration power and said auxiliary absorber may comprise an adjusting mechanism for increasing/decreasing an absorption power.

Said triple effect absorption refrigerating machine may further comprise a path having a vapor valve for guiding a refrigerant vapor generated in said high temperature regenerator and/or said intermediate temperature regenerator to a regenerator having a one-step lower pressure level.

Yet further, said triple effect absorption refrigerating machine may further comprise a path for introducing the solution in said high concentration circulation path into said low concentration circulation path and for returning the solution in said low concentration circulation path to said high concentration circulation path to make a balanced circulation with respect to said introduction of the solution.

Furthermore, said cycle switching means, said adjusting mechanism for increasing/decreasing a heat-concentration power or said vapor valve may be provided with a control mechanism for adjusting an internal pressure and/or a solution temperature of said high temperature regenerator or physical quantities relating thereto so as not to exceed respective predetermined values.

Further, according to a fourth aspect of the present invention, there is provided a triple effect absorption refrigerating machine comprising a high temperature regenerator, an intermediate temperature regenerator, a low temperature regenerator, a condenser, an absorber, an evaporator, an auxiliary regenerator, an auxiliary absorber and a path for interconnecting these devices, said triple effect absorption refrigerating machine further comprising: a high concentration circulation path for circulating a solution among said absorber, said auxiliary regenerator, said intermediate temperature regenerator and said high temperature regenerator; and a low concentration circulation path for circulating a solution between said auxiliary absorber and said low temperature regenerator, said triple effect absorption refrigerating machine still further comprising: a path for guiding a refrigerant vapor generated in said auxiliary regenerator to said auxiliary absorber; a path for guiding a refrigerant vapor generated in said intermediate temperature regenerator to said low temperature regenerator and/or said auxiliary regenerator in the heating section(s) thereof; and a path for guiding a refrigerant vapor generated in said high temperature regenerator to said intermediate temperature regenerator in the heating section thereof, said triple effect absorption refrigerating machine characterized in that said low temperature regenerator and/or said auxiliary regenerator are provided with a heat-transfer pipe for receiving an exhaust heat from an external source to heat the solution.

Yet further, according to a fifth aspect of the present invention, there is provided a triple effect absorption refrigerating machine comprising a high temperature regenerator, an intermediate temperature regenerator, a low temperature regenerator, a condenser, an absorber, an evaporator, an auxiliary regenerator, an auxiliary absorber and a path for interconnecting these devices, said triple effect absorption refrigerating machine further comprising: a high concentration circulation path for circulating a solution among said absorber, said auxiliary regenerator, said intermediate temperature regenerator and said high temperature regenerator; and a low concentration circulation path for circulating a solution between said auxiliary absorber and said low temperature regenerator, said triple effect absorption refrigerating machine still further comprising: a path for guiding a refrigerant vapor generated in said auxiliary regenerator to said auxiliary absorber; a path for guiding a refrigerant vapor generated in said intermediate temperature regenerator to said low temperature regenerator and said auxiliary regenerator in the heating sections thereof; and a path for guiding a refrigerant vapor generated in said high temperature regenerator to said intermediate temperature regenerator in the heating section thereof, said triple effect absorption refrigerating machine characterized in that said intermediate temperature regenerator is provided with a heat-transfer pipe for receiving an exhaust heat from an external source to heat the solution.

In the present invention, the triple effect absorption refrigerating machine has been additionally provided with an auxiliary regenerator and an auxiliary absorber to partially interpose a cycle of low concentration in the typical triple effect cycle to help reduce a vapor pressure in the intermediate temperature regenerator or the high temperature regenerator which are serving as a heat source for the cycle.

More specifically, a typical triple effect absorption refrigerating machine is provided with the auxiliary regenerator and the auxiliary absorber so that the concentrated solution as before being supplied to the absorber is partially or entirely heat-concentrated in the auxiliary regenerator and then supplied to the absorber, while the refrigerant vapor generated in the auxiliary regenerator is absorbed in the solution in the auxiliary absorber to produce a diluted solution.

In regenerating (concentrating) the solution of low concentration from the auxiliary absorber in the low temperature regenerator, since the boiling temperature of the solution has been lowered due to the low concentration thereof, the vapor saturation temperature in the intermediate temperature regenerator serving as the heat source and thus the boiling temperature of the solution in the intermediate temperature regenerator are lowered, and consequently the vapor saturation temperature in the high temperature regenerator serving as the heat source for the intermediate temperature regenerator is also lowered, resulting in successful lowering of the boiling temperature of the solution in the high temperature regenerator and thus lowering of the temperature of the heat source required for the high temperature regenerator.

That is, the cycle established with the aid of the additional devices of the auxiliary regenerator and the auxiliary absorber comprises two types of cycles including a low concentration cycle and a high concentration cycle, wherein the high concentration cycle serves as a cycle for providing a driving power, in which the absorber absorbs the refrigerant vapor from the evaporator and produces the refrigerating effect, while the low concentration cycle serves as an auxiliary cycle for preventing the high concentration cycle from being driven to a high temperature and/or a high pressure.

There should be no problem, even if the solution supplied to the auxiliary regenerator is supplied from the absorber, the intermediate temperature regenerator or the high temperature regenerator. Further, the solution in the auxiliary regenerator may be returned to the absorber via the intermediate temperature regenerator or the high temperature regenerator or via both of them without causing any troubles. What is required is that the auxiliary regenerator should be contained in the high concentration cycle.

The auxiliary regenerator disposed in the high concentration cycle can concentrate the solution, and the refrigerant vapor generated in the auxiliary regenerator is not directed to the condenser but absorbed in the auxiliary absorber having a lower pressure (lower dew point) than the condenser. The solution in the auxiliary absorber that has absorbed the refrigerant vapor turns out to be of low concentration, and if the thus diluted solution is regenerated (concentrated) in the low-temperature regenerator, it can be achieved at a relatively low temperature, allowing the refrigerant vapor to be directly discharged to the condenser. Adding this low concentration cycle can decrease the dew point of the vapor to be generated in the intermediate temperature regenerator defined in the high concentration side, and thus suppress the refrigerant vapor pressure in the high temperature regenerator, which supplies a heat to the intermediate temperature regenerator.

The foregoing and other objects and features of the present invention will be apparent from the following description of embodiments of the present invention provided in conjunction with the attached drawings.

DESCRIPTION OF THE PREFERRED EMBODIMENTS

Preferred embodiments of an absorption refrigerating machine according to the present invention will now be described with reference to the attached drawings.

Figure 1:
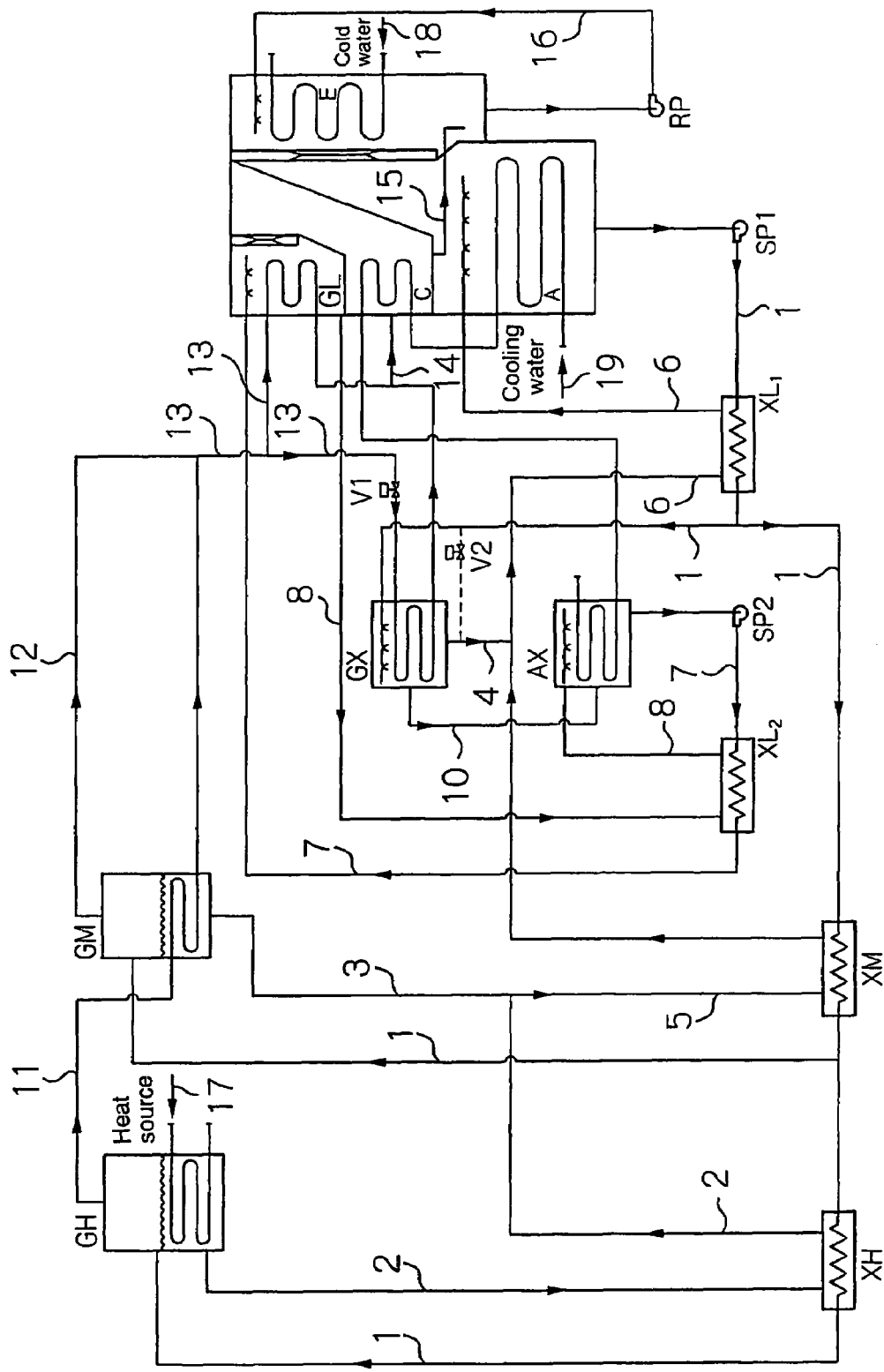
FIG. 1 is a flow diagram showing one embodiment of an absorption refrigerating machine of the present invention.
Figure 4A:
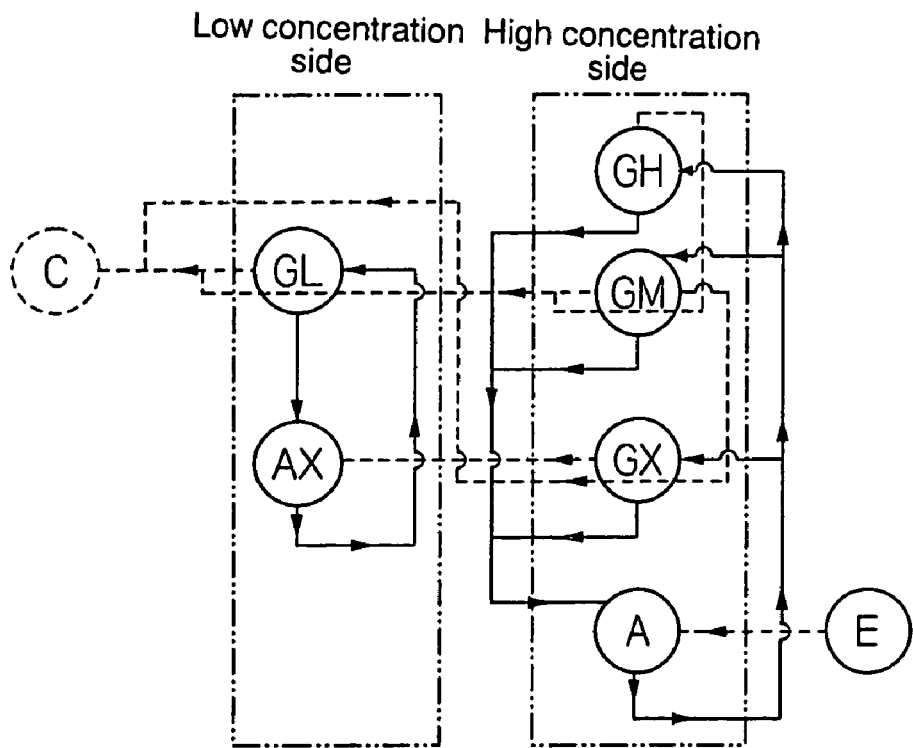
FIG. 4(a) and FIG. 4(b) are simplified illustrations of the flow diagrams of FIG. 1 and FIG. 2, respectively.

An embodiment of the present invention, as shown in FIG. 1 and FIG. 4(a) in a simplified illustration of the flow diagram of FIG. 1, includes a solution circulation system composed of a low-concentrated solution circulation system for a solution circulation primarily between an auxiliary absorber AX and a low temperature regenerator GL and a high-concentrated solution circulation system for a solution circulation primarily among an absorber A, a high temperature regenerator GH and an intermediate regenerator GM, which is provided for suppressing a pressure (refrigerant saturation temperature) and a solution temperature in a high temperature regenerator GH even in the circumstance of a high cooling water temperature.

Figure 2:
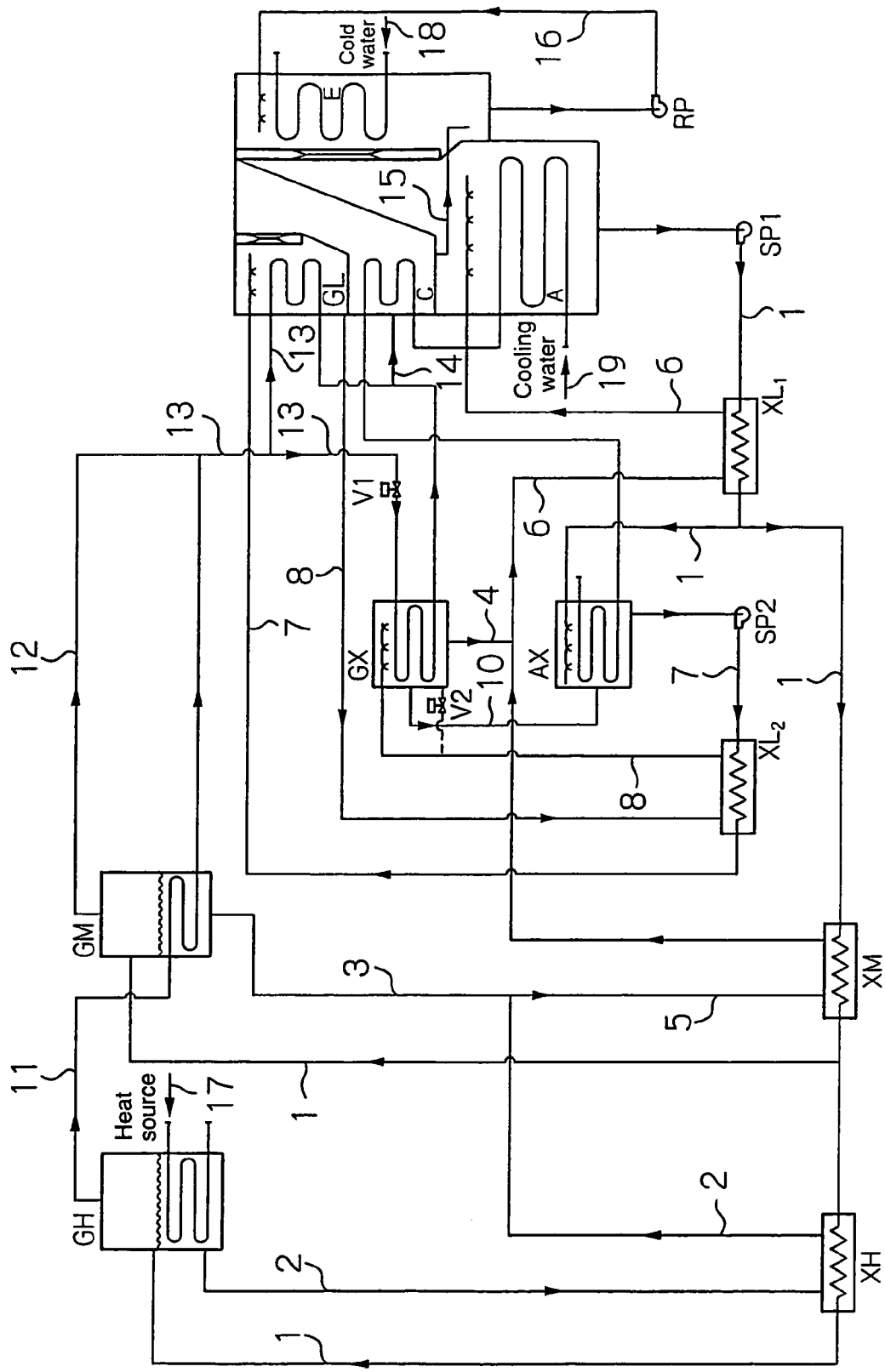
FIG. 2 is a flow diagram showing another embodiment of an absorption refrigerating machine of the present invention.
Figure 4B:
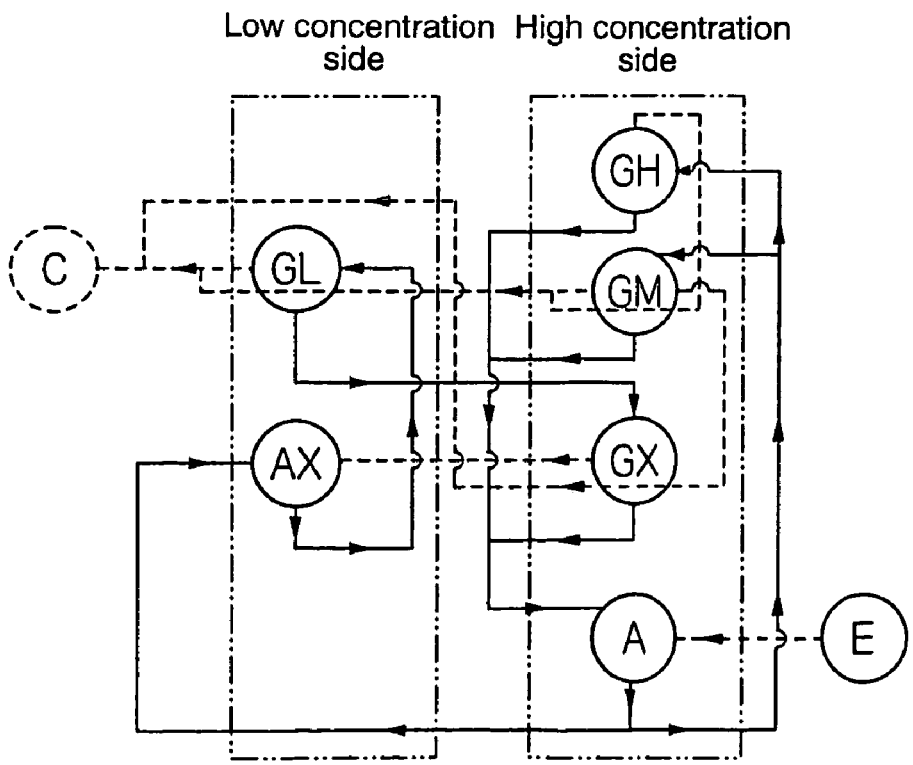

Another embodiment of the present invention, as shown in FIG. 2 and FIG. 4(b) in a simplified illustration of the flow diagram of FIG. 2, has a configuration, in which an auxiliary absorber AX and an auxiliary regenerator GX are disposed in the same circulation system, providing a solution circulation from an absorber A through the auxiliary absorber AX, a low temperature regenerator GL and the auxiliary regenerator GX back to the absorber A, while adjusting a heating power of the auxiliary regenerator GX. On the other hand, the solution is also circulating among the absorber A, a high temperature regenerator GH and an intermediate temperature regenerator GM. This is the cycle to be employed in case of the temperature drop of the cooling water having started. It is to be noted that in FIGS. 4(a) and 4(b), the solid line indicates the flow of the solution and the broken line indicates the flow of the refrigerant vapor.

Figure 3:
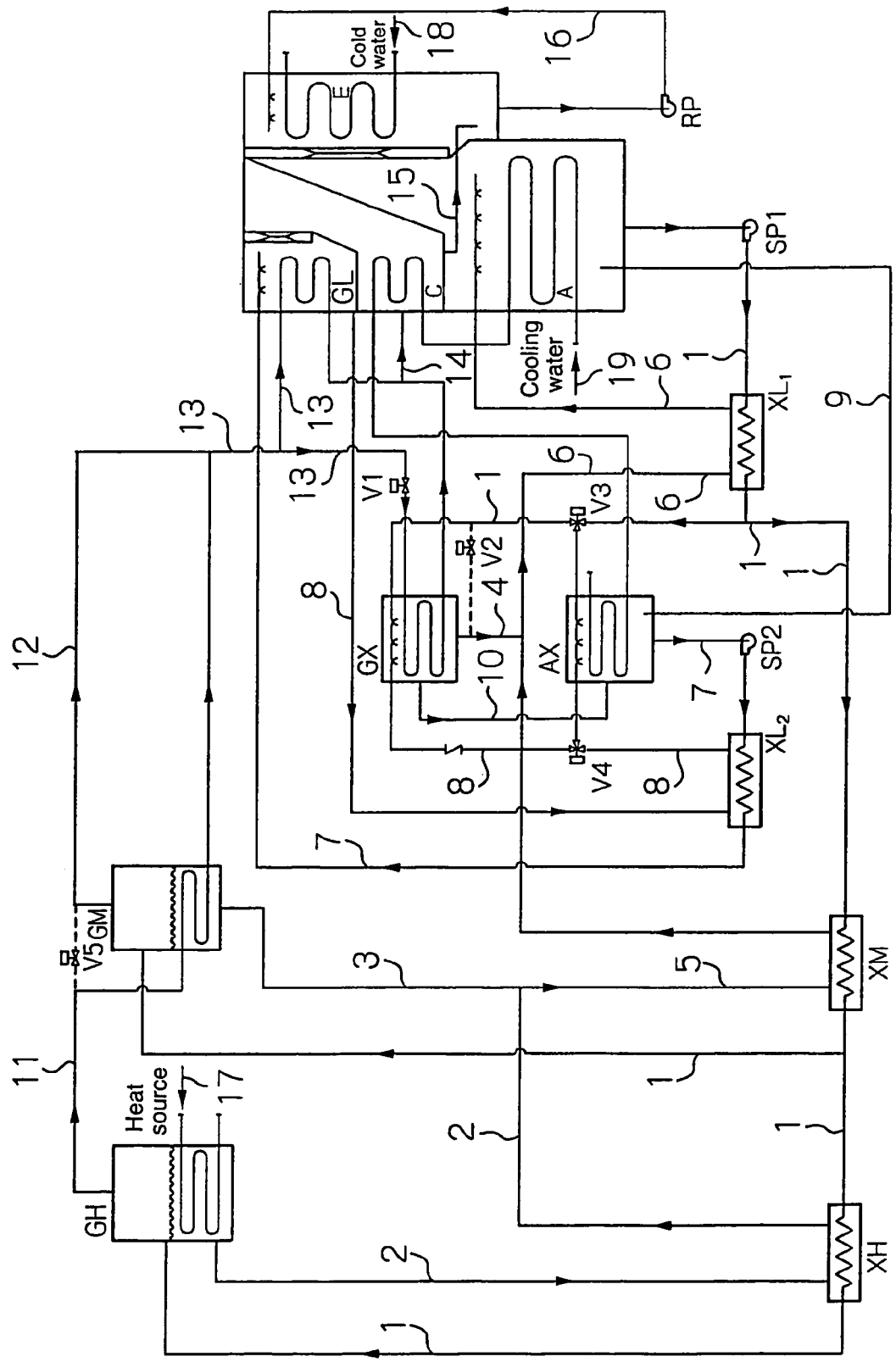
FIG. 3 is a flow diagram showing still another embodiment of an absorption refrigerating machine of the present invention.

Those cycles of FIG. 1 and FIG. 2 can be established in a single apparatus shown in FIG. 3 by adjusting a distribution mechanism V3, V4 for the solution in the solution circulation system (this is equivalent to the switching operation if the flow rate at one of the V3 and V4 is adjusted to zero) and by adjusting a heating power adjusting mechanism V1, V2 in the auxiliary regenerator GX.

Providing those adjusting operations continuously and gradually allows for a continuous shifting to be applied to the cycles such that the cycles may be adjusted and controlled so as to suppress the pressure or the solution temperature in the high temperature regenerator to or below the target values.

If the temperature of the cooling water rises too high and those cycles are no longer able to cope with the situation, then the refrigerant vapor in a regenerator of one-step higher pressure may be guided to a regenerator of one-step lower pressure to thus enable an operation equivalent to the double effect operation, which can suppress the pressure or the solution temperature in the high temperature regenerator.

Further, the present invention has employed a configuration, in which said absorber is segmented into a low pressure absorber and a high pressure absorber and said evaporator is segmented into a low pressure evaporator and a high pressure evaporator, wherein a cold water is at first guided to the high pressure evaporator and the refrigerated cold water is then guided to the low pressure evaporator, while a concentrated solution from said regenerator is at first guided to the low pressure absorber, where refrigerant vapor from the low pressure evaporator is absorbed in the solution, and the solution that has absorbed the refrigerant vapor in the low pressure absorber is then guided to the high pressure absorber, where the refrigerant vapor from the high pressure evaporator is absorbed in the solution, realizing a two-step configuration for the absorber and the evaporator to thereby lower the solution concentration of the cycles and thus the pressure and the temperature in the high temperature regenerator, which can further enhance the effect of the present invention.

The preferred embodiments of the present invention will be further described in detail with reference to the attached drawings.

FIGS. 1 to 3 represent flow diagrams showing different embodiments of the triple effect absorption refrigerating machine according to the present invention.

In FIGS. 1 to 3, elements are individually designated by the given alphabetical and numeric codes as follows: an evaporator is designated by E; an absorber A; a condenser C; a low temperature regenerator GL; an intermediate temperature regenerator GM; a high temperature regenerator GH; an auxiliary absorber AX; an auxiliary regenerator GX; a heat exchanger in the low temperature side XL1, XL2; a heat exchanger in the intermediate temperature side XM; a heat exchanger in the high temperature side XH; solution pumps SP1, SP2; a refrigerant pump RP; control valves V1 to V5; solution channels 1 to 8; a U-shaped piping 9; refrigerant vapor channels 10 to 13; refrigerant channels 14 to 16, a heat source 17; cold water 18; and cooling water 19.

To explain the present invention with reference to FIG. 1, the auxiliary absorber AX absorbs refrigerant vapor that is generated in the heat-concentration process of a solution in the auxiliary regenerator GX.

A dilute solution in the auxiliary absorber AX is guided through the channel 7 into the low temperature regenerator GL, where the solution is heated and concentrated by refrigerant vapor flowing through the channels 12 and 13 from the intermediate temperature regenerator GM, and the thus processed solution is returned to the auxiliary absorber AX. The refrigerant vapor generated in the low temperature regenerator GL is condensed in the condenser C and flows through the channel 15 back to the evaporator E. A dilute solution in the absorber A is forwarded through the channel 1 to the auxiliary regenerator GX, the intermediate temperature regenerator GM and the high temperature regenerator GH, respectively.

The solution supplied to the auxiliary regenerator GX is heated and concentrated with the aid of the refrigerant vapor that has been generated in the intermediate temperature regenerator GM and supplied from the channels 12 and 13, and the solution supplied to the intermediate temperature regenerator GM is heated and concentrated with the aid of the refrigerant vapor that has been generated in the high temperature regenerator GH and supplied from the channel 11, while the solution supplied to the high temperature regenerator GH is heated and concentrated by the external heat source 17. Thus concentrated solutions flow from the channels 2, 3 and 4 through the channels 5 and 6 back to the absorber A, respectively, where the refrigerant vapor from the evaporator E is absorbed into the solution.

Figure 6A:
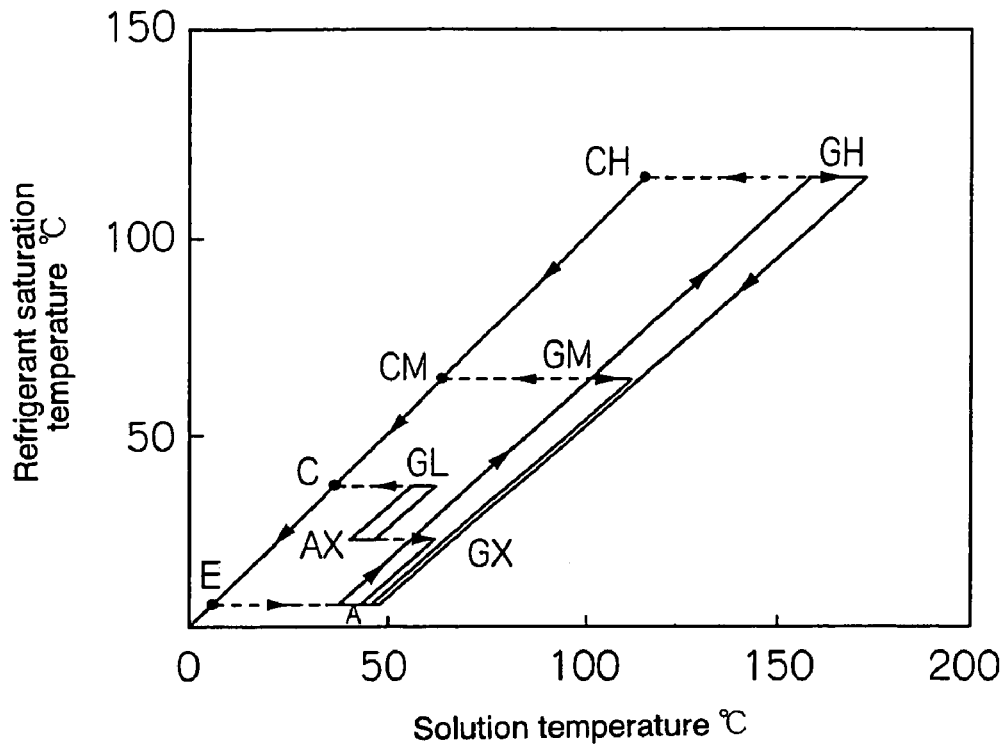
FIG. 6(a) is a Dühring chart representing a solution cycle of FIG. 1

FIG. 6(a) is a plot of the above cycle on a Dühring chart.

The refrigerant vapor generated in the high temperature regenerator GH, when saturated, is indicated by CH of FIG. 6(a), where it is serving as the heat source for the intermediate temperature regenerator GM, while the refrigerant vapor generated in the intermediate temperature regenerator GM, when saturated, is indicated by CM of FIG. 6(a), where it is serving as the heat source for the low temperature regenerator GL and the auxiliary regenerator GX and then turns to be condensed, and the resultant refrigerant is now directed to the condenser C and then to the evaporator E along with the refrigerant that has been generated in the low temperature regenerator GL and condensed in the condenser C.

Figure 6B:
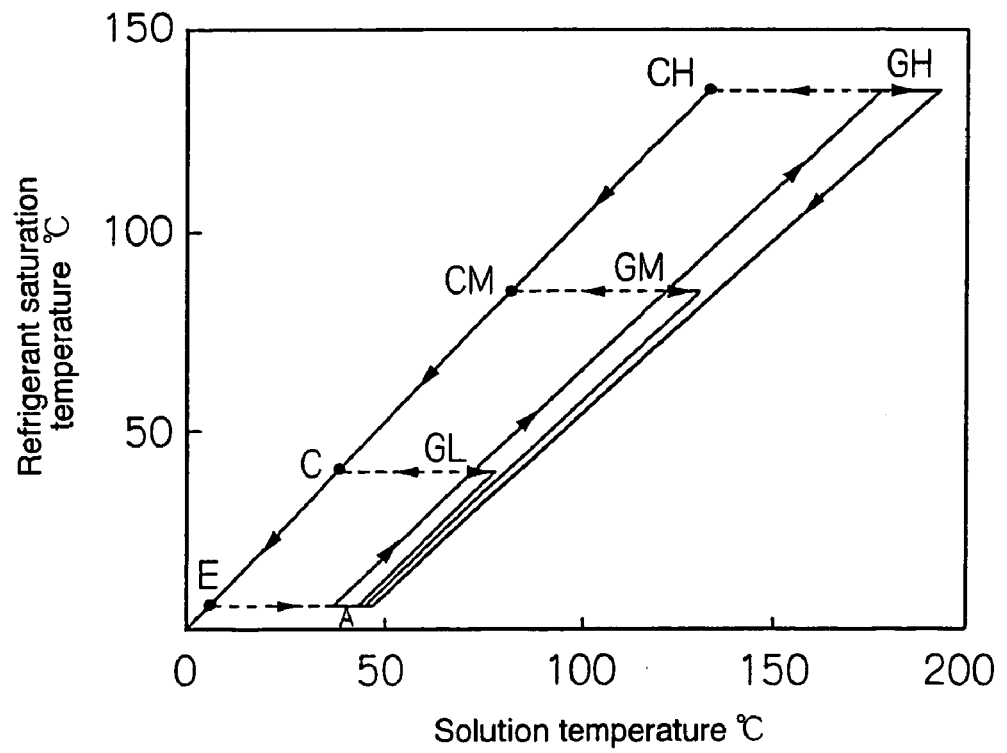
FIG. 6(b) is a Dühring chart of a cycle with an auxiliary absorber AX and an auxiliary regenerator GX removed from the flow diagram of FIG. 1.

FIG. 6(b) is a plot on the Dühring chart indicating the cycle for the case with the auxiliary absorber AX and the auxiliary regenerator GX removed from the previous system, or the triple effect cycle.

In the comparison of FIG. 6(a) to FIG. 6(b), since the solution concentration of the low temperature regenerator GL is low and thus the boiling temperature has dropped, therefore ultimately the vapor saturation temperature in the high temperature regenerator GH is decreased and thus the boiling temperature of the solution in the high temperature regenerator GH is lowered. A difference of 20° C. or greater is read in the solution temperature at the exit port of the high temperature regenerator GH.

Switching between the cycle indicated in FIG. 6(a) and the cycle indicated in FIG. 6(b) can be carried out by opening/closing the vapor valve V1 of FIG. 1 to thereby activate/suspend the function of the auxiliary regenerator GX. Alternatively, the switching operation can be also carried out by opening/closing the solution feed adjusting valve V2 of FIG. 1 to thereby supply/stop the flow of solution to the auxiliary regenerator GX and thus activate/suspend the function of the auxiliary regenerator GX.

Further, the heating power of the auxiliary regenerator GX can be controlled by adjusting the opening of the vapor valve V1 or the solution feed adjusting valve V2.

Further, the absorption power of the auxiliary absorber AX (including the suspending of the function) can be controlled by adjusting the flow rate of the cooling water directed to the auxiliary absorber AX or the flow rate of the solution fed to the auxiliary absorber AX, through not shown.

Further, it is also feasible to control both of the heating power of the auxiliary regenerator GX and the absorption power (including the suspending of the function) of the auxiliary absorber GA by adjusting the opening of the vapor valve V1 and/or the solution feed control valve V2 and by adjusting the flow rate of the cooling water or the solution fed to the auxiliary absorber AX.

FIG. 2 is a flow diagram showing another embodiment of an absorption refrigerating machine according to the present invention.

With reference to FIG. 2, a part of the dilute solution from the absorber A is fed to the auxiliary absorber AX and the rest of the solution is fed to the intermediate temperature regenerator GM and the high temperature regenerator GH. In the auxiliary absorber AX, the solution absorbs the refrigerant vapor from the channel 10, which is generated during the process of the heat-concentration of the solution in the auxiliary regenerator GX, thereby to be further diluted. Thus produced dilute solution is directed via the channel 7 to the low temperature regenerator GL, where it is heated and concentrated by the refrigerant vapor flowing through the channels 12 and 13 from the intermediate temperature regenerator GM, and then guided to the auxiliary regenerator GX as just mentioned above, where it is further heated and concentrated with the refrigerant vapor flowing through the channels 12 and 13 from the intermediate temperature regenerator GM.

The dilute solution that has been fed to the intermediate temperature regenerator GM via the channel 1 is heated and concentrated by using the refrigerant vapor flowing through the channel 11 from the high temperature regenerator GH as the heat source, while the solution that has been fed to the high temperature regenerator GH is heated and concentrated by the external heat source 17 and then supplied through the channel 6 to the absorber A along with the concentrated solution that has been concentrated in the above-mentioned auxiliary regenerator GX, where the solution absorbs the refrigerant vapor from the evaporator E.

Again in the absorption refrigerating machine of FIG. 2, similarly to the absorption refrigerating machine of FIG. 1, the auxiliary regenerator GX can be switched in its operation between the activating and the suspending of the function and also the heating power thereof can be controlled by adjusting the opening of the vapor valve V1, and the absorption power of the auxiliary absorber AX (including the suspending of the function) can be controlled by adjusting the flow rate of the cooling water or the flow rate of the solution supplied to the auxiliary absorber AX.

FIG. 3 is a flow diagram showing yet another embodiment of an absorption refrigerating machine according to the present invention, in which the cycles of FIG. 1 and FIG. 2 can be established in a single unit of apparatus with the aid of the solution distribution valves V3 and V4 (or otherwise by way of the valve switching). It is to be remembered in this apparatus that not only the full-switched cycles but also an intermediate cycle is available. That is, the cycle can be still established, even if the distribution of the solution is continuously changed over a range of 0% to 100%. In the intermediate cycle, the valve V3 is activated so that a part of the dilute solution from the absorber A flows into the auxiliary absorber AX and the rest part thereof is distributed to the auxiliary regenerator GX, and the dilute solution in the auxiliary absorber AX is supplied to the low temperature regenerator GL, where it is concentrated, while the valve V4 is activated so that a part of the concentrated solution is fed to the auxiliary regenerator GX and the rest of the solution is returned to the auxiliary absorber AX. That is, in order to make a balance of a total solution content, a certain quantity of solution equivalent to the quantity of solution that has been supplied from the absorber A to the auxiliary absorber AX (a substantially equivalent quantity in an absorbent) is returned from the low temperature regenerator GL to the auxiliary regenerator GX. Since it is difficult to make a balance in the content simply by means of the distribution using the valves V3 and V4, the configuration of FIG. 3 has contemplated that a lower portion of the absorber A and a lower portion of the auxiliary absorber AX are connected with the U-shaped piping 9 so as to permit the communication of the solution while maintaining the pressure difference therebetween, thus to realize a good balance.

It is also contemplated that the valve V3, V4 is not necessarily the three-way valve but may be made up of a combination of two-way valve(s) or the like.

Further, as will be described later, in addition to the switching between the cycles of FIG. 1 and FIG. 2 by using the solution distribution valves V3 and V4, the heating power of the auxiliary regenerator GX can be controlled by adjusting the opening of the vapor valve V1 and/or the solution feed control valve V2, and further the above control operations can effect the switching among the cycle of FIG. 1, the cycle of FIG. 2 and the triple effect cycle with the functions of the auxiliary regenerator GX and the auxiliary absorber AX having been suspended.

Further, in order to avoid an abnormal high pressure in the high temperature regenerator GH, in one solution, the solution in the high concentration circulation system may be introduced into the low concentration circulation system, and to make a balance with respect to this, the solution in the low concentration circulation system may be returned back to the high concentration circulation system. To address this, many different types of piping are contemplated, and for example, the solution distribution valve V3 may be used to disperse the solution from the absorber A (in the high concentration circulation system) over the auxiliary absorber AX (in the low concentration circulation system) and the U-shaped piping 9 may be used to return the solution in the auxiliary absorber AX back to the absorber A.

FIGS. 5(*a*) to 5(*f*) are plotting on the Dühring chart of the cycle of the absorption refrigerating machine of FIG. 3, that is changed in association with the cooling water temperature. The introduction rate of refrigerant vapor from the intermediate temperature regenerator GM to the auxiliary regenerator GX is controlled by the vapor valve V1 to thereby change the regeneration power (heat-concentration performance) of the auxiliary regenerator GX. The power change of the auxiliary regenerator GX can be also provided by the valve V2 on the path bypassing the auxiliary regenerator GX heat-transfer section and indicated by the broken line of FIG. 3.

FIG. 5(*a*) shows a case where the valve V1 is fully closed and so the function of the auxiliary regenerator GX has been suspended, thus providing the cycle for the triple effect. As the opening of the valve V1 is increased to thereby enhance the function of the auxiliary regenerator GX, the concentration of the dilute solution directed to the low temperature regenerator GL is lowered, exhibiting the changes as illustrated in FIG. 5(*b*) to FIG. 5(*c*), resulting in the temperature decrease in the solution at the outlet port of the high temperature regenerator GH.

Around the stage shown in FIG. 5(*c*) to FIG. 5(*d*), the solution distribution varies from the feature corresponding to FIG. 2 into the feature corresponding to FIG. 1 and finally the cycle as shown in FIG. 5(*f*) may be established, where the system can be operated without the high temperature regenerator GH being subject to high pressure even at the cooling water temperature as high as 31° C. to 32° C.

Figure 7:
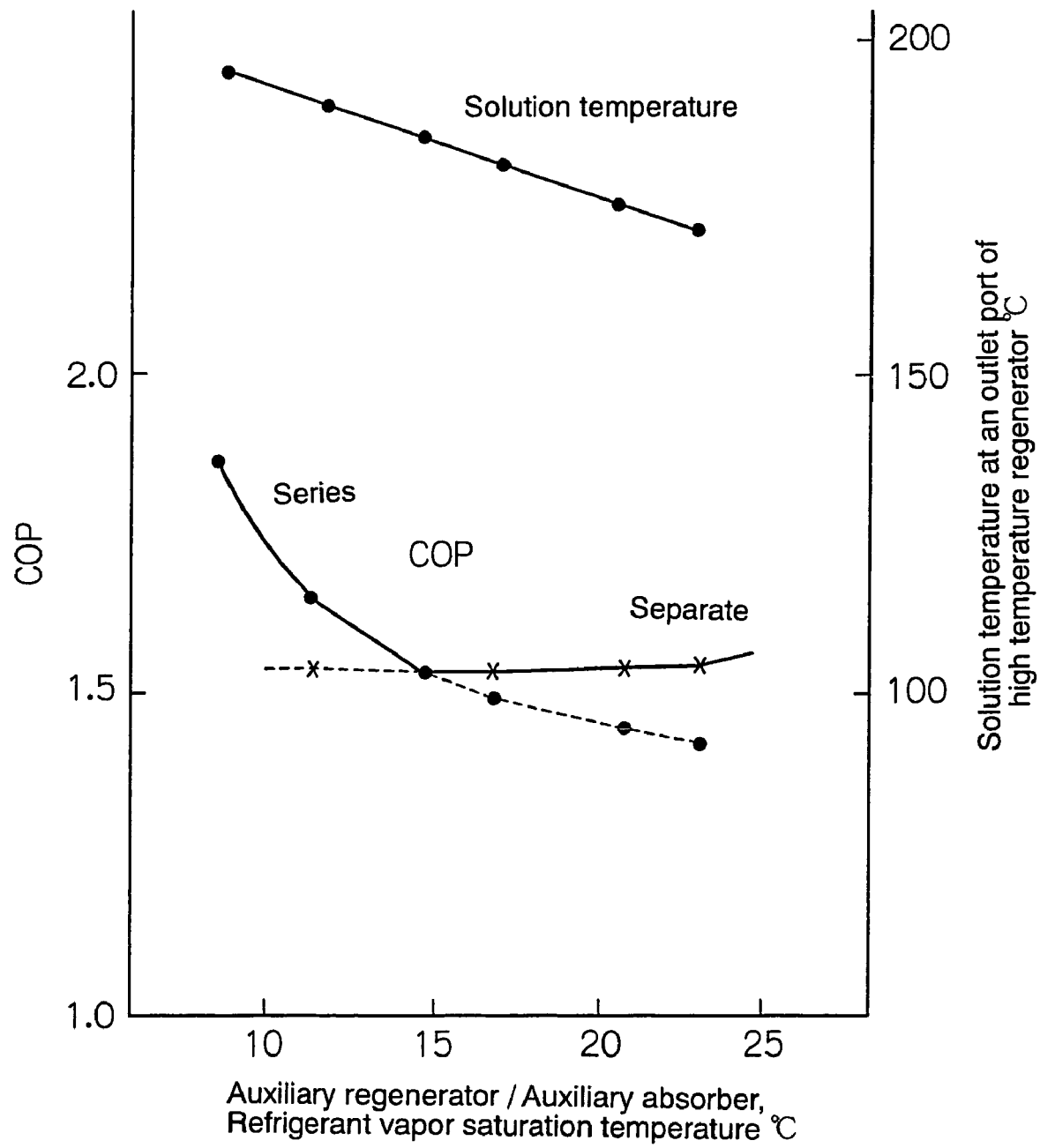
FIG. 7 is a graphical representation showing a relationship among a refrigerant vapor saturation temperature in an auxiliary absorber AX and an auxiliary regenerator GX, a COP and a solution temperature at an output port of a high temperature regenerator.

FIG. 7 is a graphical representation of the cycle corresponding to FIG. 1 (indicated as SEPARATE from the reason that cycle comprises two separate groups) and the cycle corresponding to FIG. 2 (indicated as SERIES from the reason that it provides a solution circulation in a series of an absorber, an auxiliary absorber, a low temperature regenerator and an auxiliary regenerator) indicating a temperature of the high temperature regenerator and an effect of an absorption refrigerating machine (COP) for a constant cooling water temperature at 31° C. with different auxiliary regenerator heating powers so as to obtain different auxiliary regenerator pressures (refrigerant vapor saturation temperatures), and this shows that the COP is obviously better in entire region than the COP=1.2 associated with the double effect system.

If the opening of the vapor valve V1 is adjusted so as to increase the auxiliary regenerator heating power, the auxiliary regenerator pressure (the refrigerant vapor saturation temperature) increases but the solution temperature in the high temperature regenerator decreases. The solid line represents values for the selection of control to provide higher COP values through the solution distribution control in V3, V4.

It is to be noted that the actual control should be provided to carry out the operation of higher COP within an allowable range that would not cause the cooling water temperature to drop and the solution temperature or the pressure in the high temperature regenerator to rise. FIG. 5 is an exemplary cycle selected in association with the cooling water temperature. In another control, for example, a target value of the refrigerant saturation temperature in the auxiliary regenerator may be set based on the cooling water temperature, and in that case, the control valve VI will be adjusted to gain the target value and/or the openings of the valve, V3, V4 will be adjusted to control the distribution of the solution depending on the refrigerant saturation temperature of the auxiliary regenerator.

Figure 5A:
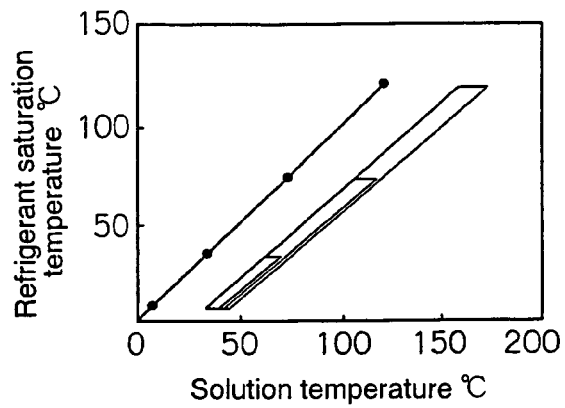
FIG. 5(a) to FIG. 5(f) are Dühring charts, each graphically representing a change in cycle in association with a different power of an auxiliary regenerator GX in the flow of FIG. 3.
Figure 5D:
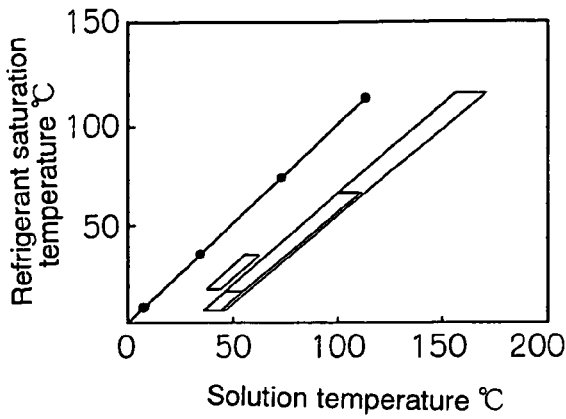
Figure 5B:
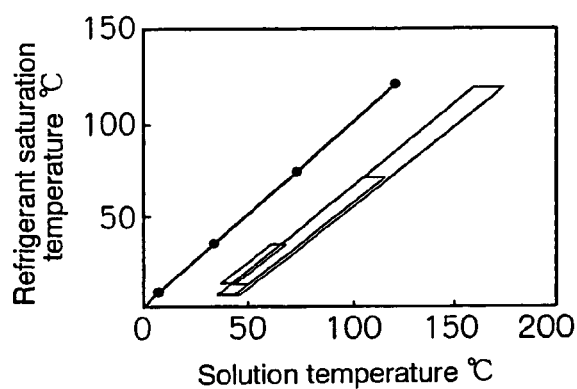
Figure 5E:
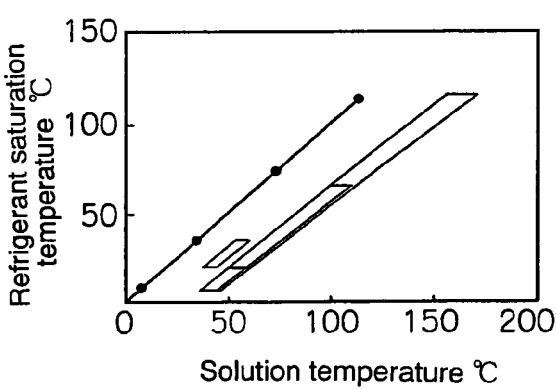
Figure 5C:
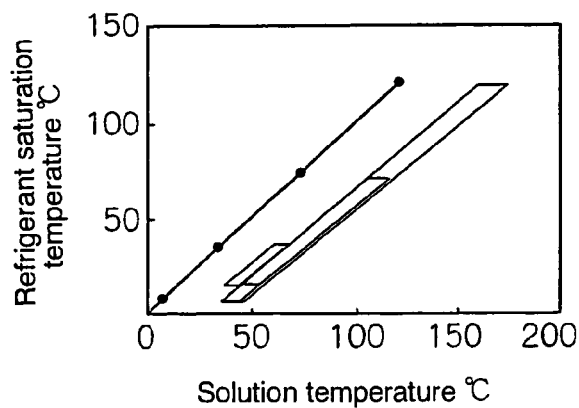
Figure 5F:
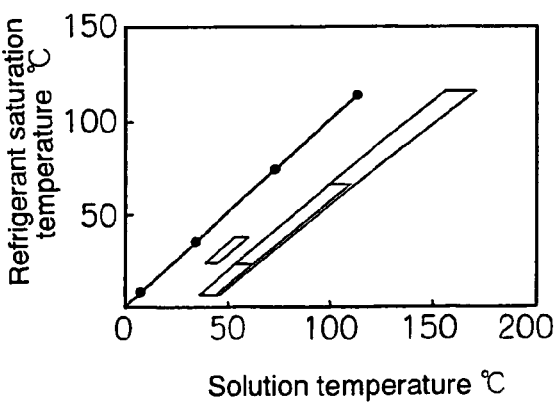

When the temperature in the high temperature regenerator GH is required to be further lower than that in the cycle of FIG. 5(f), the valve V5 of FIG. 3 is used to allow the refrigerant vapor from the high temperature regenerator GH to bypass the intermediate temperature regenerator GM to thereby provide the operation corresponding to the double effect, where the pressure and the solution temperature in the high temperature regenerator are decreased. Further, the adjustment of the valves V1, V3 and V4 enables an intermediate cycle that provides an effect defined between the single effect and the double effect.

It is to be noted that a similar operation may be provided by using a vapor valve (not shown) allowing the refrigerant vapor from the intermediate temperature regenerator GM to be relieved to the condenser C.

Further, the present invention is applicable to a triple effect absorption refrigerating machine of the two-step absorption type. In order to decrease the solution temperature of the high temperature regenerator to further lower by taking advantage of a temperature difference of the cold water between an inlet and an outlet ports, the absorber A of said absorption refrigerating machine is segmented into a low pressure absorber AL and a high pressure absorber AH and the evaporator E is segmented into a low pressure evaporator EL and a high pressure evaporator EH, in which the cold water is at first introduced into the high pressure evaporator EH, and the refrigerated cold water is then guided to the low pressure evaporator EL, while at the same time the concentrated solutions from the auxiliary regenerator GX, the intermediate temperature regenerator GM and the high temperature regenerator GH are at first introduced into the low pressure absorber AL, where the refrigerant vapor from the low pressure evaporator is absorbed in the solution, and the solution that has absorbed the refrigerant vapor in the low pressure absorber AL is further guided to the high pressure absorber AH, where the refrigerant vapor from the high pressure evaporator EH is absorbed in the solution, thus successfully suppressing the concentration of the solution exiting out of the absorber A to be lower.

A part of the solution that has absorbed the refrigerant vapor in the high pressure absorber AH is supplied to the auxiliary absorber AX, where it is further diluted, then supplied to the low temperature regenerator GL, where the boiling temperature of the solution is decreased, resulting in a successful reduction of the solution temperature and the required heat source temperature in the high temperature regenerator GH.

Figure 8A:
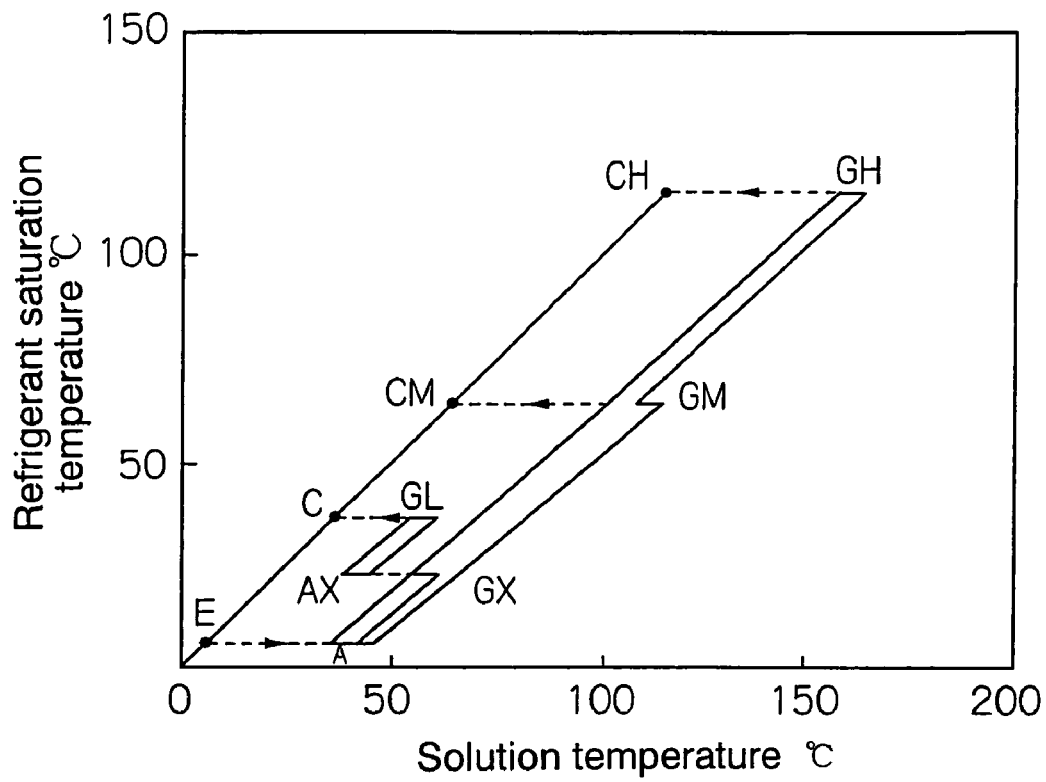
FIG. 8(a) and FIG. 8(b) are Dühring charts of another solution cycle to which the present invention is applicable.
Figure 8B:
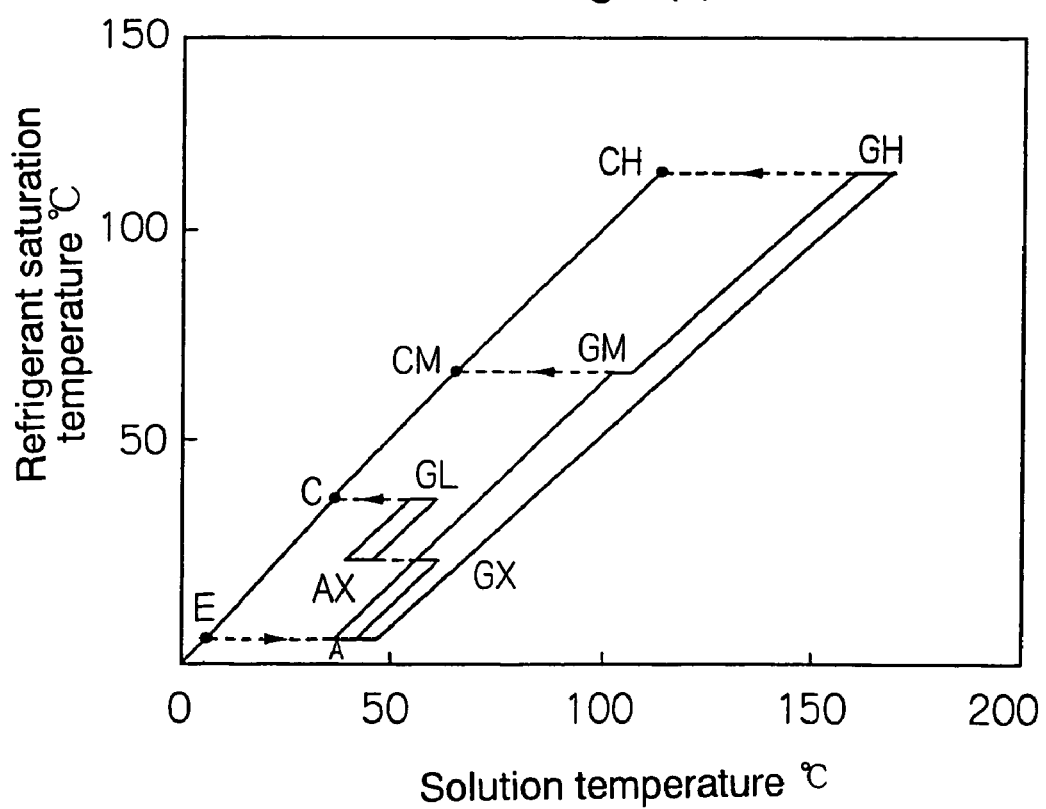

Adding to those described above, there may be various types of flow in the solution path for the triple effect and the present invention may be favorably applicable to those different ones. FIGS. 8(a) and 8(b) are plotting of some of those examples representing their cycles on the Dühring charts.

It is also feasible that an external heat source defining a lower temperature than that introduced into the high temperature regenerator GH may be introduced to the intermediate temperature regenerator GM, the low temperature regenerator GL or the auxiliary regenerator GX, in addition to the heating by the refrigerant vapor from the high temperature regenerator GH, and this allows for an effective use of the exhaust heat or the like. For a case using the vapor as the heat source for the high temperature regenerator GH, the heat from the vapor drain may be used as one type of exhaust heat.

Figure 9:
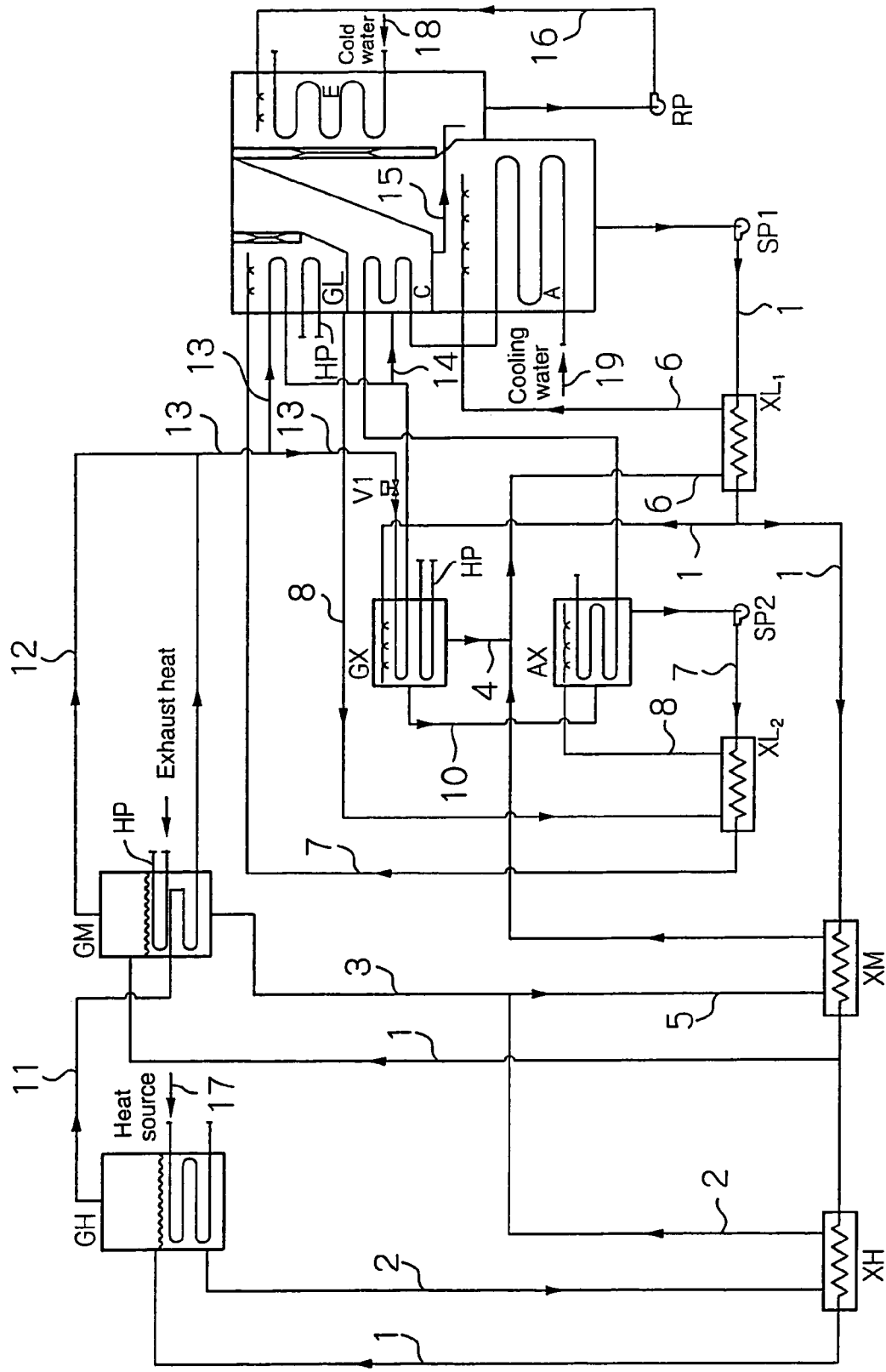
FIG. 9 is a flow diagram showing yet another embodiment of an absorption refrigerating machine of the present invention.

FIG. 9 is a flow diagram showing another embodiment of the present invention using an external heat source.

This embodiment contemplates another configuration of the absorption refrigerating machine of FIG. 1, in which each of the intermediate temperature regenerator GM, the low temperature regenerator GL and the auxiliary regenerator GX is provided with a heat-transfer pipe HP to which an exhaust heat from an external source is introduced to heat the solution therein, and this configuration may help save such a high temperature heat source (produced through the combustion of a fuel and the like) that would be otherwise introduced in the high temperature regenerator GH.

To explain this, assuming that the quantity of the refrigerant vapor generated by the exhaust heat is denoted in the term of G, for producing the same refrigeration output, the above configuration can reduce the quantity of the refrigerant vapor to be generated in the high temperature regenerator GH by about G/2.5, and thus can reduce the high temperature heat source to be introduced into the high temperature regenerator GH. The configuration imposes a requirement that a location where the exhaust heat can be introduced is limited to such a location where the exhaust heat temperature is higher than the solution temperature, and the fact that the exhaust heat temperature is typically lower than that of the heat source for the high temperature regenerator implies that the exhaust heat may be introduced to either of the intermediate temperature regenerator GM, the low temperature regenerator GL or the auxiliary regenerator GX. In this operation, if both of the low temperature regenerator GL and the auxiliary regenerator GX are heated exclusively with the exhaust heat, occasionally the refrigerant vapor in the intermediate temperature regenerator GM could not be condensed, from which it is considered preferable that either one of them is heated exclusively with the exhaust heat.

The combination of the heating operation using the refrigerant vapor directed to each of the regenerators with the heating operation using the exhaust heat supplied from the external source is not limited to that shown in FIG. 9 but a variety of combinations may be employed, including the followings, for example.

The present invention contemplates, in one example, a triple effect absorption refrigerating machine comprising a high temperature regenerator GH, an intermediate temperature regenerator GM, a low temperature regenerator GL, a condenser C, an absorber A, an evaporator E, an auxiliary regenerator GX, an auxiliary absorber AX and a path for interconnecting these devices, said triple effect absorption refrigerating machine further comprising: a high concentration circulation path for circulating a solution among the absorber A, the auxiliary regenerator GX, the intermediate temperature regenerator GM and the high temperature regenerator GH; and a low concentration circulation path for circulating a solution between the auxiliary absorber AX and the low temperature regenerator GL, said triple effect absorption refrigerating machine still further comprising: a path for guiding refrigerant vapor generated in the auxiliary regenerator GX to the auxiliary absorber AX; a path for guiding a refrigerant vapor generated in the intermediate temperature regenerator GM to the low temperature regenerator GL and/or the auxiliary regenerator GX in the heating sections thereof; and a path for guiding a refrigerant vapor generated in the high temperature regenerator GH to the intermediate temperature regenerator GM in the heating section thereof, said triple effect absorption refrigerating machine characterized in that said low temperature regenerator GL and/or said auxiliary regenerator GX may be provided with a heat-transfer pipe HP for receiving an exhaust heat from an external source to heat the solution therein.

It is further contemplated that in the triple effect absorption refrigerating machine having the cycle as described previously, the intermediate temperature regenerator GM may be provided with a heat-transfer pipe HP for receiving an exhaust heat from the external source to heat the solution therein.

It is further contemplated that in the triple effect absorption refrigerating machine of the cycle as described previously, if the low temperature regenerator GL and the auxiliary regenerator GX are provided with a heat-transfer pipe HP for receiving the exhaust heat from the external source to heat the solution therein, the exhaust heat may be embodied by a fluid of sensible heat, wherein said fluid may be guided to the low temperature regenerator GL and then to the auxiliary regenerator GX.

It is further contemplated that in the triple effect absorption refrigerating machine of the cycle as described previously, if the intermediate temperature regenerator GM is provided with the heat-transfer pipe HP for receiving the exhaust heat from the external source to heat the solution therein, the exhaust heat may be embodied by the fluid of sensible heat, wherein said fluid may be firstly guided to the intermediate temperature regenerator GM and then to the low temperature regenerator GL and/or the auxiliary regenerator GX.

The present invention further contemplates a triple effect absorption refrigerating machine comprising a high temperature regenerator GH, an intermediate temperature regenerator GM, a low temperature regenerator GL, a condenser C, an absorber A, an evaporator E, an auxiliary regenerator GX, an auxiliary absorber AX and a path for interconnecting these devices, said triple effect absorption refrigerating machine further comprising: a high concentration circulation path for circulating a solution among the absorber A, the auxiliary regenerator GX, the intermediate temperature regenerator GM and the high temperature regenerator GH; and a low concentration circulation path for circulating a solution between the auxiliary absorber AX and the low temperature regenerator GL, said triple effect absorption refrigerating machine still further comprising: a path for guiding a refrigerant vapor generated in the auxiliary regenerator GX to the auxiliary absorber AX; a path for guiding a refrigerant vapor to be generated in the intermediate temperature regenerator GM to the low temperature regenerator GL and the auxiliary regenerator GX in the heating sections thereof; and a path for guiding a refrigerant vapor to be generated in the high temperature regenerator GH to the intermediate temperature regenerator GM in the heating section thereof, said triple effect absorption refrigerating machine characterized in that the intermediate temperature regenerator GM may be provided with a heat-transfer pipe HP for receiving an exhaust heat from the external source to heat the solution therein.

Although in the above description, the heat-transfer pipe HP serving for introducing the exhaust heat from the external source is included in the same drum with the regenerator, such as GM, GL, GX, the HP may be disposed in a separate drum arranged in parallel or series with the regenerator, GM, GL, GX.

Further, such a heat exchanger that heats a solution with an exhaust heat from an external source may be disposed at other locations than the intermediate temperature regenerator GM, the low temperature regenerator GL and the auxiliary regenerator GX.

Further, the triple effect absorption refrigerating machine of the above-described cycle may be provided with such a means that can activate and suspend a function of the auxiliary regenerator GX and/or the auxiliary absorber AX described above.

Furthermore, when the load is small, the high temperature heat source to the high temperature regenerator GH may be suspended but the exhaust heat is exclusively supplied to continue the operation.

It is to be noted that although in FIGS. 1 to 3 and 9, the cooling water is illustrated to flow through the absorber A, the condenser C and the auxiliary absorber AX in this order, it may at first flow through the condenser C, or may flow in parallel with respect to respective devices.

Further, a flow sequence of the cooling wafer may be modified to lower the solution temperature, and in one sequence, by way of example, the cooling water may be arranged to flow through the absorber A and the auxiliary absorber AX in parallel with each other, and then a part thereof may be branched to flow through the condenser C and then returned back to the original point of branch.

Further, the auxiliary regenerator GX may be located in front of, behind or in parallel with the high temperature regenerator GH and the intermediate temperature regenerator GM so far as it is contained in the high concentration cycle.

Figure 10:
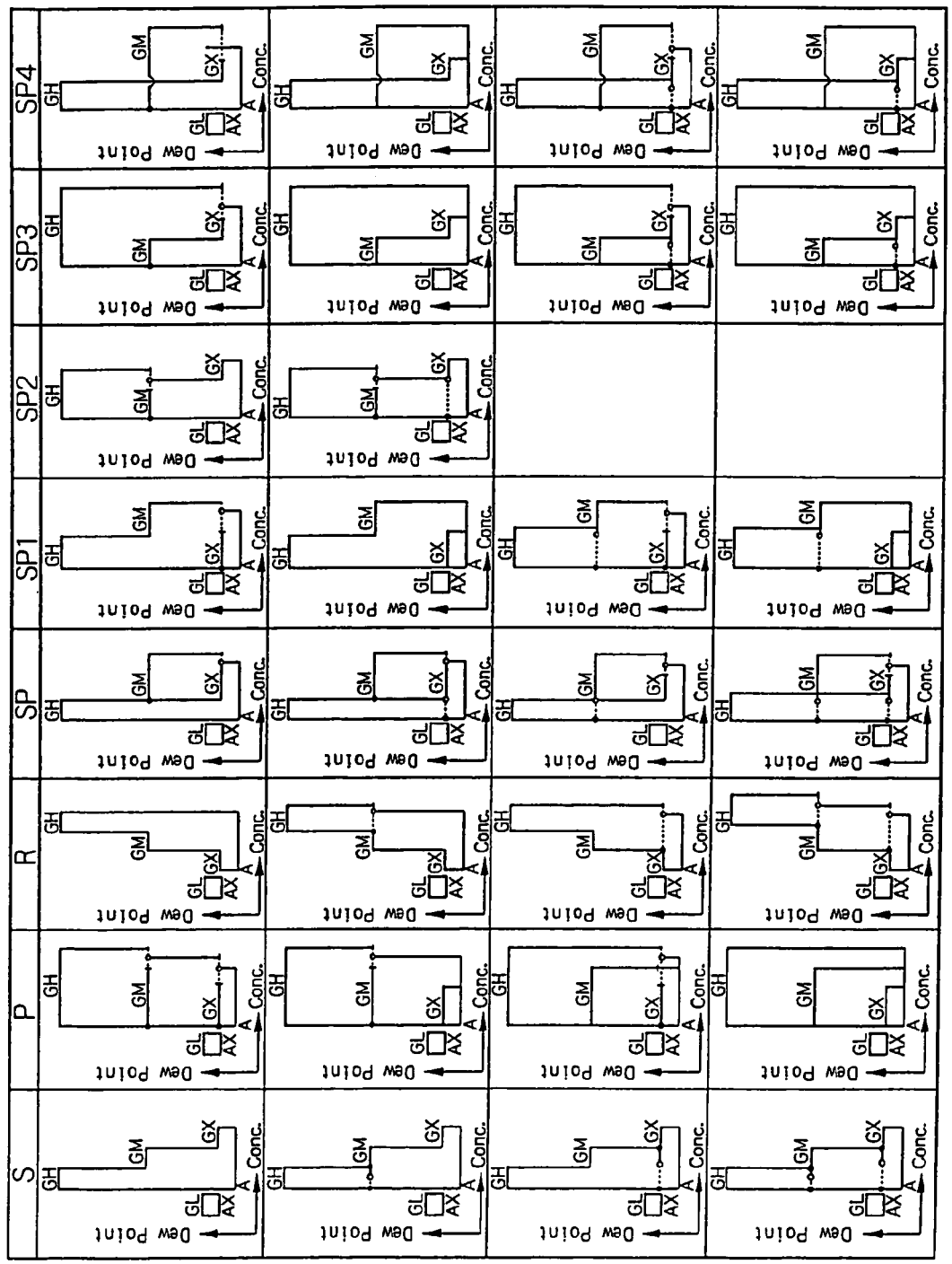
FIG. 10 is a table listing up exemplary cycle patterns of a triple effect absorption refrigerating machine to which the present invention has been applied.
Figure 10:
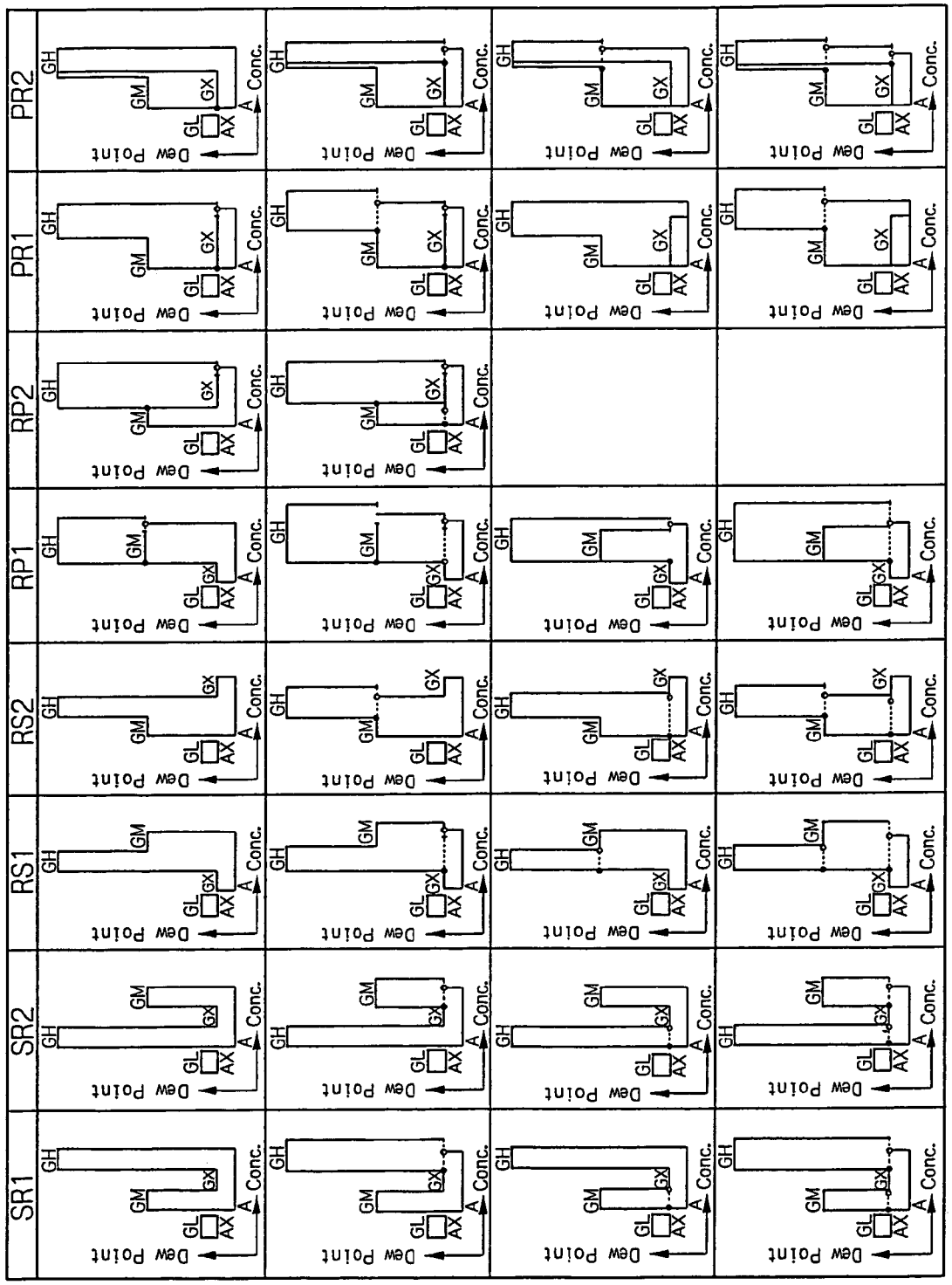

FIG. 10 is a table listing examples of a cycle pattern of a triple effect absorption refrigerating machine to which the present invention has been applied.

The present invention is directed to the addition of the auxiliary regenerator GX and the auxiliary absorber GA to thereby prevent a temperature and a pressure in the high temperature regenerator of triple effect cycle from rising excessively and thus to lower the pressure or the solution temperature in the high temperature regenerator, and the present invention may be combined with any types of triple effect and accordingly includes all types of the triple effect system added with the auxiliary regenerator and the auxiliary absorber. FIG. 10 shows 16 groups of basic patterns: S, P, R, SP, PS1, PS2, PS3, PS4, SR1, SR2, RS1, RS2, RP1, RP2, PR1 and PR2, as well as their variations.

Each of those cycle patterns shown in FIG. 10 can read in the following manner.

A vertical axis represents a Dew Point, or a saturation temperature relative to a refrigerant vapor pressure, a horizontal axis represents a Concentration of an absorbent solution and each cycle represents a cycle of the solution (any refrigerant system on or around the concentration of 0% are not illustrated). A vertical solid line indicates a dew point counterbalancing with the solution temperature that will be changed. A vertical line section works to allow the heat contained in a concentrated solution to be recovered in a dilute solution side, though no indication thereof is provided in the cycle. A horizontal solid line represents the change in concentration of the solution from the concentration process or the absorption process. A broken line represents the mixing process. (It is to be remembered that the concentration is not changing along the broken line but instead two types of liquid are mixed to make a resultant concentration represented by a white dot). A black dot indicates a branching point of the solution. It is to be noted that in the drawings, GH designates a high temperature regenerator, GM an intermediate temperature regenerator, GL a low temperature regenerator, GX an auxiliary regenerator, AX an auxiliary absorber and A an absorber.

An explanation will now be given with reference to the illustrative examples in the list.

S Cycle (1) S Cycle (Top): Solid Line Only

A dilute solution exited out of the absorber A enters the high temperature regenerator GH, where it is concentrated (Horizontal solid line).

The solution exited out of the high temperature regenerator GH enters the intermediate temperature regenerator GM, where it is concentrated. (Horizontal solid line)

The solution exited out of the intermediate temperature regenerator GM enters the auxiliary regenerator GX, where it is concentrated. (Horizontal solid line)

The solution exited out of the auxiliary regenerator GX enters the absorber A, where it absorbs the refrigerant and turns to be the diluted solution. (Horizontal solid line)

(2) S Cycle (Upper Middle): Broken Line in GM Section

The majority of a dilute solution exited out of the absorber A enters the high temperature regenerator GH, where it is concentrated. (Horizontal solid line)

A part of the dilute solution exited out of the absorber A is branched at the point of the black dot to enter the intermediate temperature regenerator GM, (Horizontal broken line), and is mixed with the solution that has been concentrated in the high temperature regenerator GH. The white dot at the right end of the broken line indicates the concentration of the mixture.

The mixed solution is concentrated in the intermediate temperature regenerator GM. (Horizontal solid line)

The solution exited out of the intermediate regenerator GM enters the auxiliary regenerator GX, where it is concentrated. (Horizontal solid line)

The concentrated solution exited out of the auxiliary regenerator GX enters the absorber A, where it absorbs the refrigerant and turns to be the diluted solution. (Horizontal solid line)

(3) S Cycle (Lower Middle): Broken Line in GX Section

The majority of a dilute solution exited out of the absorber A enters the high temperature regenerator GH, where it is concentrated. (Horizontal solid line)

The solution exited out of the high temperature regenerator GH enters the intermediate temperature regenerator GM, where it is concentrated. (Horizontal solid line)

A part of the solution exited out of the absorber A is branched at the point of the black dot to enter the auxiliary regenerator GX (Horizontal broken line), where it is mixed with the solution that has been concentrated in the intermediate temperature regenerator GM. The white dot at the right end of the broken line indicates the concentration of the mixture.

The mixed solution is concentrated in the auxiliary regenerator GX. (Horizontal solid line)

The concentrated solution exited out of the auxiliary regenerator GX enters the absorber A, where it absorbs the refrigerant and turns to be the diluted solution. (Horizontal solid line)

(4) S Cycle (Bottom): Broken Line in GM, GX Section

The majority of a dilute solution exited out of the absorber A enters the high temperature regenerator GH, where it is concentrated. (Horizontal solid line)

A part of the solution exited out of the absorber A is branched at the point of the black dot to enter the intermediate temperature regenerator GM (Horizontal broken line), where it is mixed with the solution that has been concentrated in the high temperature regenerator GH. The white dot at the right end of the broken line indicates the concentration of the mixture.

The mixed solution is concentrated in the intermediate temperature regenerator GM. (Horizontal solid line)

A part of the solution exited out of the absorber A is branched at the point of the black dot to enter the auxiliary regenerator GX (Horizontal broken line), where it is mixed with the solution that has been concentrated in the intermediate temperature regenerator GM. The white dot at the right end of the broken line indicates the concentration of the mixture.

The mixed solution is concentrated in the auxiliary regenerator GX. (Horizontal solid line)

The solution exited out of the auxiliary regenerator GX enters the absorber A, where it absorbs the refrigerant and turns to be the diluted solution. (Horizontal solid line)

P Cycle (1) P Cycle (Top):

A part of a dilute solution exited out of the absorber A is branched at the point of the black dot toward the low auxiliary regenerator GX, while a part of the rest of the dilute solution is branched at the point of the upper black dot to enter the intermediate temperature regenerator GM, and the remainder of the dilute solution is supplied to the high temperature regenerator GH.

The solution that has entered the high temperature regenerator GH is concentrated. (Horizontal solid line)

The solution exited out of the high temperature regenerator GH is supplied to the intermediate temperature regenerator GM and mixed with the concentrated solution and turns to be the solution having a concentration of the mixture indicated by the white dot.

The solution exited out of the intermediate regenerator GM is supplied to the auxiliary regenerator GX and mixed with the concentrated solution and turns to be the solution having a concentration of the mixture indicated by the white dot.

The concentrated solution exited out of the auxiliary regenerator GX enters the absorber A, where it absorbs the refrigerant and turns to be the diluted solution. (Horizontal solid line)

(2) P Cycle (Upper Middle):

A part of a dilute solution exited out of the absorber A is branched at the point of the black dot located in the outlet port of the absorber to enter the low auxiliary regenerator GL, while a part of the rest of the dilute solution is branched at the point of the upper black dot toward the intermediate temperature regenerator GM, and the remainder of the dilute solution is supplied to the high temperature regenerator GH.

The solution that has entered the high temperature regenerator GH is concentrated. (Horizontal solid line)

The solution exited out of the high temperature regenerator GH is supplied to the intermediate temperature regenerator GM and mixed with the concentrated solution and turns to be the solution having a concentration of the mixture indicated by the white dot.

The dilute solution supplied to the auxiliary regenerator GX is independently concentrated. (Horizontal solid line)

The concentrated solutions exited out of the intermediate temperature regenerator GM and the auxiliary regenerator GX enter the absorber A, where the resultant solution absorbs the refrigerant and turned to be the diluted solution. (Horizontal solid line)

(If mixing at the inlet port of the absorber, the line may be partially represented by the broken line. For separate entrance, the lines are represented in the solid line. Either may be applied. The same applied to the description below)

(3) P Cycle (Lower Middle)

A part of a dilute solution exited out of the absorber A is branched at the point of the black dot located in the outlet port of the absorber toward the auxiliary regenerator GX, while a part of the rest of the dilute solution is branched at the point indicated by the upper black dot to enter the intermediate temperature regenerator GL, and the rest of the solution is supplied to the high temperature regenerator GH.

The solution that has entered the high temperature regenerator GH is concentrated. (Horizontal solid line)

The solution exited out of the high temperature regenerator GH is supplied to the auxiliary regenerator GX and mixed with the concentrated solution and turns to be the solution having a concentration of the mixture indicated by the white dot.

The dilute solution supplied to the intermediate temperature regenerator GM is independently concentrated. (Horizontal solid line)

The concentrated solutions exited out of the intermediate temperature regenerator GM and the auxiliary regenerator GX enter the absorber A, where the resultant solution absorbs the refrigerant and turns to be the diluted solution. (Horizontal solid line)

(4) P Cycle (Bottom):

A dilute solution exited out of the absorber A is branched at the point of the black dot located in the outlet port of the absorber and one part of the solution is directed to the auxiliary regenerator GX, another part of the solution is directed to the intermediate temperature regenerator GM, and the remainder of the solution is directed to the high temperature regenerator GH.

The dilute solution that has entered the high temperature regenerator GH is concentrated. (Horizontal solid line)

The dilute solution that has been supplied to the intermediate temperature regenerator GM is independently concentrated. (Horizontal solid line)

The dilute solution that has been supplied to the auxiliary regenerator GX is independently concentrated. (Horizontal solid line)

The solutions exited out of the high temperature regenerator GH, the intermediate temperature regenerator GM and the auxiliary regenerator GX enter the absorber A, where the resultant solution absorbs the refrigerant and turns to be the diluted solution. (Horizontal solid line)

R Cycle (1) R Cycle (Upper):

A dilute solution exited out of the absorber A is supplied to the auxiliary regenerator GX, where it is concentrated. (Horizontal solid line)

A solution exited out of the auxiliary regenerator GX is supplied to the intermediate regenerator GM, where it is further concentrated. (Horizontal solid line)

A solution exited out of the intermediate temperature regenerator GM is supplied to the high temperature regenerator GH, where it is further concentrated. (Horizontal solid line)

A solution exited out of the high temperature regenerator GH enters the absorber A, where it absorbs the refrigerant and turns to be the diluted solution. (Horizontal solid line)

(2) R Cycle (Upper Middle):

A dilute solution exited out of the absorber A is supplied to the auxiliary regenerator GX, where it is concentrated. (Horizontal solid line)

A solution exited out of the auxiliary regenerator GX is supplied to the intermediate regenerator GM, where it is further concentrated. (Horizontal solid line)

The majority of the solution exited out of the intermediate temperature regenerator GM is supplied to the high temperature regenerator GH, where it is further concentrated. (Horizontal solid line)

The rest of the solution exited out of the intermediate temperature regenerator GM is mixed with the solution that has been concentrated in the high temperature regenerator GH.

The mixed solution enters the absorber A, where it absorbs the refrigerant and turns to be the diluted solution. (Horizontal solid line)

(3) R Cycle (Lower Middle):

A dilute solution exited out of the absorber A is supplied to the auxiliary regenerator GX, where it is concentrated. (Horizontal solid line)

The majority of the solution exited out of the auxiliary regenerator GX is supplied to the intermediate temperature regenerator GM, where it is further concentrated. (Horizontal solid line)

The solution exited out of the intermediate temperature regenerator GM is supplied to the high temperature regenerator GH, where it is further concentrated. (Horizontal solid line)

A part of the solution exited out of the auxiliary regenerator GX is mixed with the solution from the high temperature regenerator GH.

The mixed solution enters the absorber A, where it absorbs the refrigerant and turns to be the diluted solution. (Horizontal solid line)

(4) R Cycle (Bottom):

A dilute solution exited out of the absorber A is supplied to the auxiliary regenerator GX, where it is concentrated. (Horizontal solid line)

The majority of the solution exited out of the auxiliary regenerator GX is supplied to the intermediate temperature regenerator GM, where it is further concentrated. (Horizontal solid line)

The majority of the solution exited out of the intermediate temperature regenerator GM is supplied to the high temperature regenerator GH, where it is further concentrated. (Horizontal solid line)

The rest of the solution exited out of the intermediate temperature regenerator GM is mixed with the solution that has been concentrated in the high temperature regenerator GH and further mixed with the rest of the solution that has exited out of the auxiliary regenerator GX.

The mixed solution enters the absorber A, where it absorbs the refrigerant and turns to be the diluted solution. (Horizontal solid line)

Other cycles also embody a variety of combinations consisting of the branching, the concentration and the mixing. The indication in the form of a list implies that many different types of cycles are contemplated.

It is to be noted that although in the drawings every introduction of the mixed solution is started at the inlet port of the high temperature regenerator GH, the intermediate temperature regenerator GM, or the auxiliary regenerator GX, one of the solutions may be introduced through the inlet port and the other solution to be mixed may be introduced in the middle of the course.

INDUSTRIAL APPLICABILITY

As is described in the foregoing, the absorption refrigerating machine according to the present invention, owing to its above-described configuration, advantageously enables an operation in the intermediate cycle between the double effect cycle and the triple effect cycle, which can help suppress a pressure or a solution temperature in the high temperature regenerator to or below the predetermined value, and further enables itself to operate as a triple effect absorption refrigerating machine allowing for a continuous shifting of the operation cycles from the intermediate cycle to the triple effect cycle rather than a step-by-step shifting, depending on the temperature conditions of the heat source, the cooling water or the cold water.

The invention claimed is:

1. A triple effect absorption refrigerating machine comprising:
   a high temperature regenerator;
   an intermediate temperature regenerator;
   a low temperature regenerator;
   a condenser;
   an absorber;
   an evaporator;
   an auxiliary regenerator;
   an auxiliary absorber; and
   a path for interconnecting these devices,
   said triple effect absorption refrigerating machine further comprising:
      a high concentration circulation path for circulating a solution among said absorber, said auxiliary regenerator, said intermediate temperature regenerator and said high temperature regenerator; and
      a low concentration circulation path for circulating a solution between said auxiliary absorber and said low temperature regenerator,
   wherein said triple effect absorption refrigerating machine further comprises:
      a path for guiding a refrigerant vapor generated in said auxiliary regenerator to said auxiliary absorber;
      a path for guiding a refrigerant vapor generated in said intermediate temperature regenerator to said low temperature regenerator and said auxiliary regenerator in the heating sections thereof; and
      a path for guiding a refrigerant vapor generated in said high temperature regenerator to said intermediate temperature regenerator in the heating section thereof.

2. A triple effect absorption refrigerating machine in accordance with claim 1, further comprising a means for suspending or activating a function(s) of said auxiliary regenerator and/or said auxiliary absorber.

3. A triple effect absorption refrigerating machine in accordance with claim 1, in which said intermediate temperature regenerator is provided with a heat-transfer pipe for receiving an exhaust heat from an external source to heat the solution.

4. A triple effect absorption refrigerating machine comprising:
   a high temperature regenerator;
   an intermediate temperature regenerator;
   a low temperature regenerator;
   a condenser;
   an absorber;
   an evaporator;
   an auxiliary regenerator;
   an auxiliary absorber; and
   a path for interconnecting these devices,
   said triple effect absorption refrigerating machine further comprising:
      a path serving both for guiding a part of a dilute solution from said absorber to said auxiliary absorber and for guiding a dilute solution from said auxiliary absorber to said low temperature regenerator;
      a path for returning a solution in said low temperature regenerator to said absorber via said auxiliary regenerator; and
      a path for guiding a refrigerant vapor generated in said auxiliary regenerator to said auxiliary absorber,
   wherein said triple effect absorption refrigerating machine further comprises:
      a path for guiding a refrigerant vapor generated in said intermediate temperature regenerator to said low temperature regenerator and said auxiliary regenerator in heating sections thereof; and
      a path for guiding a refrigerant vapor generated in said high temperature regenerator to said intermediate temperature regenerator in a heating section thereof.

5. A triple effect absorption refrigerating machine in accordance with claim 4, further comprising a means for suspending or activating a function(s) of said auxiliary regenerator and/or said auxiliary absorber.

6. A triple effect absorption refrigerating machine comprising:
   a high temperature regenerator;
   an intermediate temperature-regenerator;
   a low temperature regenerator;
   a condenser;
   an absorber;
   an evaporator;
   an auxiliary regenerator;
   an auxiliary absorber; and
   a path for interconnecting these devices,
   said triple effect absorption refrigerating machine further comprising a means for switching cycles among:
      (a) cycle having: a high concentration circulation path for circulating a solution among said absorber, said auxiliary regenerator, said intermediate temperature regenerator and said high temperature regenerator; and a low concentration circulation path for circulating a solution between said auxiliary absorber and said low temperature regenerator, wherein said cycle forms: a path for guiding a refrigerant vapor generated in said auxiliary regenerator to said auxiliary absorber; a path for guiding a refrigerant vapor generated in said intermediate temperature regenerator to said low temperature regenerator and said auxiliary regenerator in heating sections thereof; and a path for guiding a refrigerant vapor generated in said high temperature regenerator to said intermediate temperature regenerator in a heating section thereof;

(b) a cycle having: a path serving both for guiding a part of a dilute solution from said absorber to said auxiliary absorber and for guiding a dilute solution form said auxiliary absorber to said low temperature regenerator; a path for returning a solution in said low temperature regenerator to said absorber via said auxiliary regenerator; and a path for guiding a refrigerant vapor generated in said auxiliary regenerator to said auxiliary absorber, wherein said cycle forms: a path for guiding a refrigerant vapor generated in said intermediate temperature regenerator to said low temperature regenerator and said auxiliary regenerator in the heating sections thereof; and a path for guiding a refrigerant vapor generated in said high temperature regenerator to said intermediate temperature regenerator in the heating section thereof; and (c) a cycle for suspending a function(s) of said auxiliary regenerator and/or said auxiliary absorber in either one of said (a) or (b) cycle, said triple effect absorption refrigerating machine further comprising a means for switching cycles among said cycles (a), (b) and (c).

7. A triple effect absorption refrigerating machine in accordance with either one of claim 1, 4 or 6, in which said auxiliary regenerator comprises an adjusting mechanism for increasing/decreasing a heat-concentration power.

8. A triple effect absorption refrigerating machine in accordance with either one of claim 1, 4 or 6, in which said auxiliary absorber comprises an adjusting mechanism for increasing/decreasing an absorption power.

9. A triple effect absorption refrigerating machine in accordance with claim 6, in which said means for switching cycles, said adjusting mechanism for increasing/decreasing a heat-concentration power or said vapor valve is provided with a control mechanism for adjusting an internal pressure and/or a solution temperature of said high temperature regenerator or physical quantities relating thereto so as not to exceed respective predetermined values.

10. A triple effect absorption refrigerating machine in accordance with either one of claim 1, 4 or 6, in which said auxiliary regenerator comprises an adjusting mechanism for increasing/decreasing a heat-concentration power and said auxiliary absorber comprises an adjusting mechanism for increasing/decreasing an absorption power.

11. A triple effect absorption refrigerating machine in accordance with either one of claim 1, 4 or 6, further comprising a path having a vapor valve for guiding a refrigerant vapor generated in said high temperature regenerator and/or said intermediate regenerator to a regenerator having a one-step lower pressure level.

12. A triple effect absorption refrigerating machine in accordance with either one of claim 1, 4 or 6, further comprising a path for introducing the solution in said high concentration circulation path into said low concentration circulation path, and for returning the solution in said low concentration circulation path to said high concentration circulation path to make a balanced circulation with respect to said introduction of the solution.

13. A triple effect absorption refrigerating machine comprising:
a high temperature regenerator;
an intermediate temperature regenerator;
a low temperature regenerator;
a condenser;
an absorber;
an evaporator;
an auxiliary regenerator;
an auxiliary absorber; and
a path for interconnecting these devices,
said triple effect absorption refrigerating machine further comprising:
a high concentration circulation path for circulating a solution among said absorber, said auxiliary regenerator, said intermediate temperature regenerator and said high temperature regenerator; and
a low concentration circulation path for circulating a solution between said auxiliary absorber and said low temperature regenerator,
wherein said triple effect absorption refrigerating machine still further comprises:
a path for guiding a refrigerant vapor generated in said auxiliary regenerator to said auxiliary absorber; a path for guiding a refrigerant vapor generated in said intermediate temperature regenerator to said low temperature regenerator and/or said auxiliary regenerator in heating section(s) thereof; and a path for guiding a refrigerant vapor generated in said high temperature regenerator to said intermediate temperature regenerator in a heating section thereof,
wherein said low temperature regenerator and/or said auxiliary regenerator are provided with a heat-transfer pipe for receiving an exhaust heat from an external source to heat the solution.

14. A triple effect absorption refrigerating machine in accordance with claim 13 or 3, in which said low temperature regenerator and/or said auxiliary regenerator are provided with a heat-transfer pipe for receiving an exhaust heat from an external source to heat the solution, said exhaust heat being embodied by a fluid of sensible heat, wherein said fluid is guided to said low temperature regenerator and then to said auxiliary regenerator.

15. A triple effect absorption refrigerating machine in accordance with claim 13 or 3, in which said intermediate temperature is provided with a heat-transfer pipe for receiving an exhaust heat from an external source to heat the solution, said exhaust heat being embodied by a fluid of sensible heat, wherein said fluid is guided to said intermediate temperature regenerator and then to said low temperature regenerator and/or said auxiliary regenerator.

16. A triple effect absorption refrigerating machine comprising:
a high temperature regenerator;
an intermediate temperature regenerator;
a low temperature regenerator;
a condenser; an absorber;
an evaporator;
an auxiliary regenerator;
an auxiliary absorber; and
a path for interconnecting these devices, said triple effect absorption refrigerating machine further comprising:
  a high concentration circulation path for circulating a solution among said absorber, said auxiliary regenerator, said intermediate temperature regenerator and said high temperature regenerator; and
  a low concentration circulation path for circulating a solution between said auxiliary absorber and said low temperature regenerator,
wherein said triple effect absorption refrigerating machine still further comprises:
  a path for guiding a refrigerant vapor generated in said auxiliary regenerator to said auxiliary absorber;
  a path for guiding a refrigerant vapor generated in said intermediate temperature regenerator to said low temperature regenerator and said auxiliary regenerator in heating sections thereof; and
  a path for guiding a refrigerant vapor generated in said high temperature regenerator to said intermediate temperature regenerator in a heating section thereof,
wherein said intermediate temperature regenerator is provided with a heat-transfer pipe for receiving an exhaust heat from an external source to heat the solution.

* * * * *